United States Patent [19]
Sugamata et al.

[11] Patent Number: 5,748,358
[45] Date of Patent: May 5, 1998

[54] OPTICAL MODULATOR WITH OPTICAL WAVEGUIDE AND TRAVELING-WAVE TYPE ELECTRODES

[75] Inventors: Tohru Sugamata; Yasuyuki Miyama; Takashi Shinriki, all of Funabashi, Japan

[73] Assignee: Sumitomo Osaka Cement Co., Ltd., Tokyo, Japan

[21] Appl. No.: 873,404

[22] Filed: Jun. 11, 1997

[30] Foreign Application Priority Data

Jun. 14, 1996 [JP] Japan ................. 8-154030
Jul. 8, 1996 [JP] Japan ................. 8-208130
Oct. 31, 1996 [JP] Japan ................. 8-290101

[51] Int. Cl.$^6$ ............................. G02F 1/03
[52] U.S. Cl. ...................... 359/245; 385/2; 385/3
[58] Field of Search ...................... 359/245, 276, 359/278, 279; 385/2, 3

[56] References Cited

U.S. PATENT DOCUMENTS

| | | | |
|---|---|---|---|
| 4,850,667 | 7/1989 | Djupsjöbacka | 350/96.14 |
| 4,867,516 | 9/1989 | Baken | 350/96.14 |
| 4,904,037 | 2/1990 | Imoto et al. | 350/96.12 |
| 5,015,053 | 5/1991 | Johnson | 350/96.14 |
| 5,050,948 | 9/1991 | Hawkins, II et al. | 385/2 |
| 5,129,017 | 7/1992 | Kawano et al. | 385/3 |
| 5,138,480 | 8/1992 | Dolfi et al. | 359/251 |
| 5,185,823 | 2/1993 | Kaku et al. | 385/2 |
| 5,189,713 | 2/1993 | Shaw | 385/2 |
| 5,291,565 | 3/1994 | Schaffner et al. | 385/3 |
| 5,347,601 | 9/1994 | Ade et al. | 385/3 |
| 5,404,412 | 4/1995 | Seino et al. | 385/2 |
| 5,416,859 | 5/1995 | Burns et al. | 385/3 |
| 5,473,711 | 12/1995 | Hakogi et al. | 385/14 |
| 5,521,994 | 5/1996 | Takeuchi et al. | 385/14 |
| 5,528,707 | 6/1996 | Sullivan et al. | 385/2 |

FOREIGN PATENT DOCUMENTS

| | | | |
|---|---|---|---|
| 2-51123 | 2/1990 | Japan | G02F 1/03 |
| 2-93423 | 4/1990 | Japan | G02F 1/035 |
| 7-13711 | 2/1995 | Japan | G02F 1/035 |

OTHER PUBLICATIONS

Patent Abstracts of Japan, vol. 14, No. 296 (P–1067), Jun. 26, 1990 & JP 02 093423 A (Fujitsu Ltd) Apr. 4, 1990.
Patent Abstracts of Japan, vol. 14, No. 223 (P–1046), May 11, 1990 & JP 02 051123 A (Nippon Telegr & Teleph Corp) Feb. 21, 1990.
Patent Abstracts of Japan, vol. 18, No. 621 (P–1832), Nov. 25, 1994 & JP 06 235891 A (Sumitomo Cement Co Ltd), Aug. 23, 1994.

*Primary Examiner*—Mark Hellner
*Attorney, Agent, or Firm*—Burns, Doane, Swecker & Mathis, L.L.P.

[57] ABSTRACT

An optical modulator including a substrate made of lithium niobate having an electrooptical effect, first and second optical waveguides formed in the substrate by effecting a thermal diffusion of titanium into a surface of the substrate, a buffer layer formed on the surface of the substrate, a hot electrode provided on the buffer layer and having a width $W_e$ not larger than a width $W_f$ of the optical waveguide, first and second ground electrodes provided on the buffer layer such that these ground electrodes are symmetrical with respect to the hot electrode, and an electric field adjusting region having a width not smaller than that of the hot electrode is provided between the buffer layer and the hot electrode. First and second ground side electric field adjusting main- and sub-regions may be provided between the buffer layer and the first and second ground electrodes, respectively. An interaction between an electric field generated by applied microwave and lightwave propagating along the optical waveguides can be enhanced, and thus a driving voltage can be decreased.

42 Claims, 28 Drawing Sheets

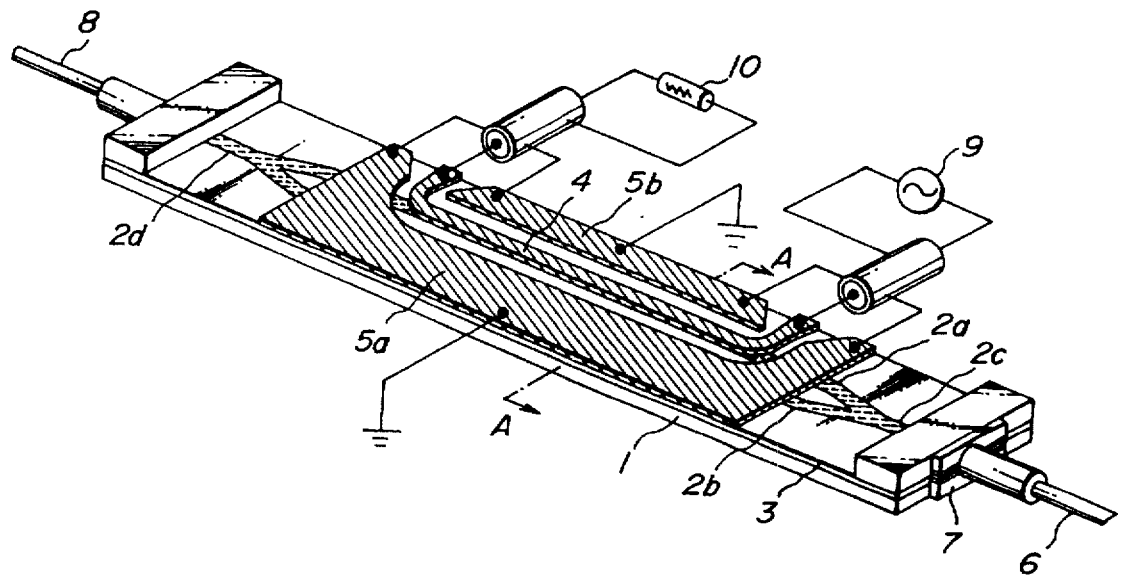
FIG_1A
PRIOR ART
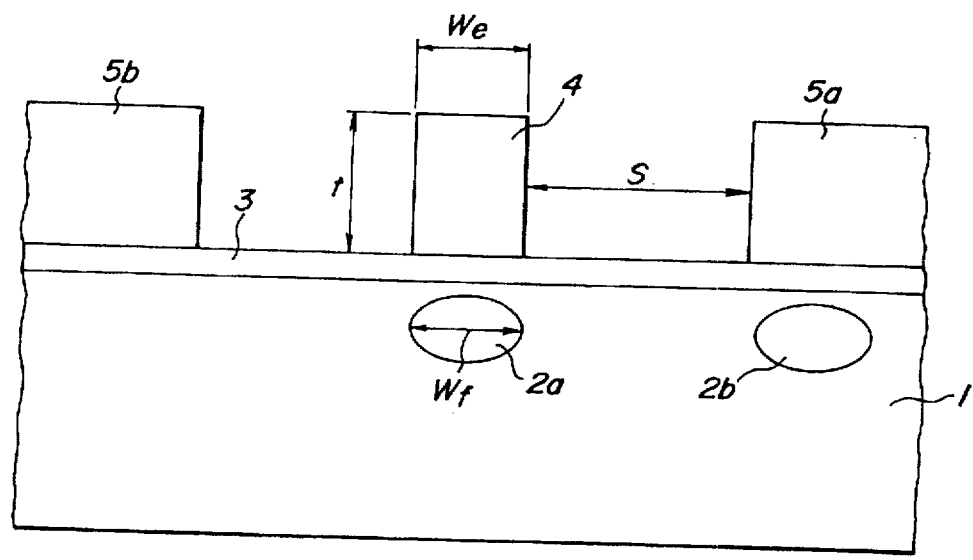
FIG_1B
PRIOR ART

FIG_4
PRIOR ART

FIG_7

FIG_10

FIG_11

FIG_17

FIG_18

FIG_27

5,748,358

OPTICAL MODULATOR WITH OPTICAL WAVEGUIDE AND TRAVELING-WAVE TYPE ELECTRODES

BACKGROUND OF THE INVENTION

1. Field of the Invention

The present invention relates to a waveguide type optical modulator for use in an optical fiber communication system of high capacity and high speed, and more particularly relates to a waveguide type optical modulator which has desired characteristic impedance and effective refractive index for a microwave and can operate at a high speed with a low driving voltage.

2. Related Art Statement

In a recent high capacity and high speed optical fiber communication system, an external modulator has been utilized instead of a direct modulator in which a laser diode is directly modulated. In the external modulator, there has been proposed a waveguide type optical modulator, in which a waveguide is formed in a substrate made of a material having an electrooptical effect such as lithium niobate $LiNbO_3$, hereinbelow it is called LN for the sake of simplicity. In one of known waveguide type external optical modulators, traveling-wave type electrodes are provided on a surface of the substrate along the optical waveguide.

In the waveguide type optical modulator having the traveling-wave type electrode, it is necessary to suppress undesired reflection of an electric signal as far as possible. To this end, a characteristic impedance of the optical modulator should be matched with that of a driver for operating the modulator. Usually, the characteristic impedance of the driver is 50Ω, and thus the characteristic impedance of the optical modulator has to be set to 50Ω. Moreover, in order to broaden a modulation bandwidth, a traveling velocity of a microwave across the hot electrode should be made identical with a velocity of lightwave propagating along the optical waveguide as far as possible. That is to say, a velocity matching is important. However, since LN has a very large dielectric constant, a velocity of the microwave traveling across the hot electrode is lower than that of the lightwave, and thus the velocity matching could be hardly attained.

There have been proposed prior art techniques for solving the above mentioned problems. For instance, Japanese Patent Publication No. 7-13711, Japanese Patent Application Laid-open Publication No. 2-51123 and Japanese Patent Application Laid-open Publication No. 2-93423 have taught several solutions. In these prior art publications, in order to satisfy the velocity matching by decreasing an effective refractive index for the microwave, a thickness of the of the hot electrode is increased, a thickness of a buffer layer is increased, a recess is formed in the substrate surface between the electrodes, or an overhung is formed in a surface of the electrode.

FIG. 1A is a perspective view showing a known external modulation type optical modulator and FIG. 1B is a cross sectional view cut along a line A—A in FIG. 1A. This known external type optical modulator is of a Mach-Zehnder type intensity modulator having two optical waveguides. The optical modulator comprises a substrate 1 made of a material having an electrooptical effect. In this example, the substrate 1 is formed by a Z-cut plate of LN. In a surface region of the substrate 1 there are formed two optical waveguides 2a and 2b in parallel with each other. As shown in FIG. 1A, these optical waveguides 2a and 2b are combined with each other at both ends thereof to form input and output side optical waveguides 2c and 2d. An input side optical fiber 6 is optically coupled with the input side optical waveguide 2c and a laminated polarizer 7 is inserted between the input side optical fiber 6 and the input side optical waveguide 2c. An output side optical fiber 8 is optically coupled with the output side optical waveguide 2d. The optical waveguides 2a–2d are formed by effecting a thermal diffusion of Ti into the surface of the substrate 1. On the surface of the substrate 1, a buffer layer 3 is formed, and one hot electrode 4 and two ground electrodes 5a and 5b are provided on the buffer layer 3. An input side end of the hot electrode 4 is connected to a microwave signal source 9 and an output side end of the hot electrode is connected to a terminal resistor 10 of 50Ω.

Among electrooptical constants of the LN substrate 1, $r_{33}$ is the largest one and therefore this is most effective when an electric field is applied in the Z direction of the substrate 1, i.e. a direction of thickness. Therefore, the hot electrode 4 is provided above the optical waveguide 2a as shown in FIG. 1B, so that the electric field is effectively applied to the optical waveguide in the Z direction. The hot electrode 4 has a width $W_e$ which is substantially equal to a width $W_f$ of the optical waveguide 2a for enhancing an interaction between the lightwave propagating along the optical waveguide and the electric field of the microwave.

FIGS. 2 and 3 are schematic cross sectional views showing the interaction between the lightwave propagating along the optical waveguide 2a and the electric field F. In FIG. 2, a width $W_e$ of the hot electrode 4 is substantially equal to a width $W_f$ of the optical waveguide 2a, and in FIG. 3, a width $W_e$ of the hot electrode 4 is smaller than a width $W_f$ of the optical waveguide 2a. In FIG. 2, the electric field F effectively traverses the optical waveguide 2a and there is produced a strong interaction between the lightwave and the electric field F. Because an amplitude of the driving voltage of the microwave is determined by a degree of the interaction, the arrangement shown in FIG. 2 is a preferable configuration for lower driving voltage than that shown in FIG. 3. In this manner, the hot electrode 4 should have a width $W_e$ substantially identical with that of the optical waveguide 2a.

A width $W_f$ of the optical waveguide 2a is dependent upon process condition of the waveguide and a wavelength of the lightwave propagating along the optical waveguide and is about 10 μm for the single mode optical waveguide of Ti diffusion type having a wavelength λ=1.5 μm.

FIG. 4 is a typical profile representing an intensity distribution of lightwave propagating along the optical waveguide 2a. In case of forming the optical waveguide 2a by effecting a thermal diffusion of Ti into the LN substrate 1, the intensity distribution of lightwave becomes a Gaussian type. From FIG. 4, it can be derived that whole width of the lightwave propagating along the optical waveguide 2a is reached at about 20 m, although an intensity of lightwave is decreased by $1/e^2$ at a width in 10 μm.

On the other hand, in the known optical modulator, the hot electrode 4 has a large thickness t in order to make the velocity of the microwave closer to that of the lightwave. That is to say, when the hot electrode has a large thickness t, an effective refractive index for the microwave is decreased so as to attain the velocity matching.

The effective refractive index $n_m$ for the microwave is affected by the large dielectric constant of the LN substrate 1 and becomes about 4.2 when the thickness t of the hot electrode is small. Whilst, an effective refractive index $n_o$ for the lightwave is about 2.2. By increasing a thickness t of the hot electrode 4, the effective refractive index for the microwave is decreased toward 2.2 because thickly formed electrode having larger surface area decreases the effective dielectric constant for the microwave.

As explained above, in the known optical modulator, in order to reduce the effective refractive index for the microwave from 4.2 to 2.2, a thickness t of the hot electrode 4 has to be made larger than a spacing S between the hot electrode 4 and the ground electrode 5a or a width $W_e$ of the hot electrode 4 has to be narrowed.

In general, the spacing S between the hot electrode 4 having a width $W_e$ of 10 μm and the ground electrodes 5a and 5b is about 20–30 μm. Therefore, in order to increase a thickness t of the hot electrode 4 larger than the electrode spacing S, the hot electrode 4 has to be formed by depositing Au by electroplating more than 30 μm.

However, in practice, it is very difficult to form such a thick electrode larger than the electrode spacing S. Moreover, there might occur a problem of peeling off of the electrode due to an internal stress produced within the deposited Au electrode. Furthermore, it is also difficult to manufacture the hot electrode having a desired cross sectional configuration reliably, and thus the characteristic impedance of the optical modulator and effective refractive index for the microwave might fluctuate. Moreover, a known solution of providing the hot electrode with the overhung portion could not be easily performed due to a limitation of the fine treating, and the above mentioned problems might also occur.

The effective refractive index for the microwave can be reduced by increasing a thickness of the buffer layer 3. However, this might cause another problem that a higher driving voltage is required. Moreover, if the effective refractive index for the microwave is decreased by reducing a width $W_e$ of the hot electrode 4, a driving voltage might be increased.

In the known solution, in which the recesses are formed in the substrate between the hot electrode and the ground electrodes for decreasing the effective refractive index for the microwave, a manufacturing process becomes very complicated and requires a large machine. Moreover, the formation of recesses might give damage to the substrate and buffer layer.

In the known optical modulator, the ground electrode 5a has a width sufficiently larger than that of the hot electrode 4, and thus lines of electric force are spread under the ground electrode 5a and the electric field density is lower than that under the hot electrode 4 as illustrated in FIG. 5. Therefore, the interaction between the electric field F and the lightwave propagating along the optical waveguides 2a and 2b becomes lower and the higher driving voltage is required. In the Mach-Zehnder type optical intensity modulator, the driving voltage may be decreased by operating the two optical waveguides 2a and 2b in a push-pull manner. However, if the modulation efficiency of one of the two optical waveguides 2a and 2b is low, the driving voltage for the whole optical modulator could not be reduced sufficiently. Moreover, in the optical modulator having a single optical waveguide, the reduction in the modulation efficiency due to the decreased interaction between the electric field F and the lightwave directly causes the increase in the driving voltage. In order to mitigate the above mentioned problem, a width of the ground electrode 5a may be decreased or a spacing between the hot electrode 4 and the ground electrode 5a may be reduced. However, then another problems might occur that a frequency characteristic might be deteriorated particularly at a high frequency and the characteristic impedance might be deviated so as to increase the undesired reflection.

FIG. 6 is a schematic cross sectional view illustrating a known Mach-Zehnder type optical intensity modulator comprising an X-cut LN substrate 1. Also in this known optical modulator, the electric field F is spread due to the fact that the ground electrodes 5a and 5b have a wider width than the hot electrode 4, and thus the interaction between the electric filed F and the lightwave propagating along the optical waveguides 2a and 2b is decreased and the high driving voltage is required.

SUMMARY OF THE INVENTION

The present invention has for its object to provide a novel and useful waveguide type optical modulator, which can solve the above mentioned problems of the known optical modulators, can have a wide modulation bandwidth, and can operate at a lower driving voltage.

It is another object of the invention to provide a novel and useful waveguide type optical modulator, in which the spread of the electric field under the ground electrode can be reduced and, thus the interaction between the electric field and the lightwave propagating along the optical waveguide under or near the ground electrode can be increased so that the driving voltage can be lowered.

According to a first aspect of the invention, a waveguide type optical modulator comprising a substrate made of a material having an electrooptical effect, at least one optical waveguide formed in a surface region of said substrate, lightwave to be modulated being propagated along said optical waveguide, a buffer layer formed on the surface of the substrate, electrodes of traveling-wave type comprising a hot electrode applying a microwave and at least one ground electrode provided on said buffer layer, said hot and ground electrodes being extended in parallel with said optical waveguide, characterized in that said hot electrode has a width $W_e$ smaller than a width $W_f$ of said optical waveguide, and that an electric field adjusting region is provided between the buffer layer and the hot electrode, said electric field adjusting region having a width h not smaller than the width $W_e$ of the hot electrode.

According to a preferable embodiment of the first aspect of the invention, said electric field adjusting region is formed above said optical waveguide and has the width h substantially equal to the width $W_f$ of the optical waveguide.

According to another preferable embodiment of the first aspect of the invention, said electric field adjusting region is formed to have a non-uniform distribution in conductivity viewed in a direction of the width thereof.

When the optical waveguide is formed below the hot electrode, a central portion of the electric field adjusting region has a higher conductivity and a peripheral portion of the electric field adjusting region has a lower conductivity. When the optical waveguide is formed between the hot electrode and the ground electrode, a central portion of the electric field adjusting region has a lower conductivity and a peripheral portion of the electric field adjusting region has a higher conductivity.

According to the first aspect of the invention, the electric field adjusting region may be made of a metal selected from the group consisting of Ti, Cr, Ni, Cu, Au and alloys thereof.

Furthermore, said electric field adjusting region may be made of a semiconductive material selected from the group consisting of Ga, In, As, Al, B, Ge, Si, Sn, Sb and compounds thereof.

According to the first aspect of the invention, a material, a thickness d and a width h of said electric field adjusting region are determined such that a characteristic impedance Z of said electrodes of traveling-wave type and an effective refractive index for the microwave are not substantially affected by the electric field adjusting region, and an interaction between the distribution of the electric field generated by the microwave applied to the hot electrode and the distribution of the intensity of the lightwave propagating along the optical waveguide is enhanced.

In a preferable embodiment of the optical modulator according to the first aspect of the invention, said electric field adjusting region has a thickness d from 150 Å to 1 µm and the width h from 2 µm to a smaller value than a sum of the width $W_e$ of the hot electrode and twice of a spacing S between the hot electrode and the ground electrode ($W_e$+ 2S).

According to a second aspect of the invention, a waveguide type optical modulator comprising a substrate made of a material having an electrooptical effect, at least one optical waveguide formed in a surface region of said substrate, lightwave to be modulated being propagated along said optical waveguide, a buffer layer formed on the surface of the substrate, electrodes of traveling-wave type comprising a hot electrode applying a microwave and at least one ground electrode provided on said buffer layer, said hot and ground electrodes being extended in parallel with said optical waveguide, characterized in that a ground side electric field adjusting main-region and a ground side electric field adjusting sub-region are provided side by side between the ground electrode and the buffer layer.

In a preferable embodiment according to the second aspect of the invention, said ground side electric field adjusting main-region is made of metal, semiconductor or a combination thereof, and said ground side electric field adjusting sub-region is made of metal, semiconductor, dielectric material or a combination thereof.

In a preferable embodiment according to the second aspect of the invention, said ground side electric field adjusting sub-region is made of a dielectric material having such a dielectric constant that the interaction between the electric field and the lightwave propagating along the optical waveguide is enhanced.

In another preferable embodiment according to the second aspect of the invention, said ground side electric field adjusting main-region is formed by an electrically conductive material layer, and said ground side electric field adjusting sub-region is formed by an air gap.

In a preferable embodiment according to the second aspect of the invention, the ground side electric field adjusting main- and sub-regions are made of a metal selected from the group consisting of Ti, Cr, Ni, Cu, Au and alloys thereof.

In another preferable embodiment according to the second aspect of the invention, said ground side electric field adjusting main- and sub-regions are made of a semiconductive material selected from the group consisting of Ga, In, As, Al, B, Ge, Si, Sn, Sb and compounds thereof.

According to the second aspect of the invention, a material, a thickness and a width of said ground side electric field adjusting main- and sub-regions are determined such that a characteristic impedance Z of said electrodes of traveling-wave type and an effective refractive index for the microwave are not substantially affected by the ground side electric field adjusting regions, and an interaction between the distribution of the electric field generated by the microwave applied to the hot electrode and the distribution of the intensity of the lightwave propagating along the optical waveguide is enhanced.

According to the invention, the substrate is preferably made of lithium niobate and said optical waveguide is formed by effecting a thermal diffusion of titanium into the substrate surface.

BRIEF DESCRIPTION OF THE DRAWINGS

FIGS. 1A and 1B are perspective and cross sectional views, respectively showing a known optical modulator of waveguide type;

DESCRIPTION OF THE PREFERRED EMBODIMENTS

Figure 7:
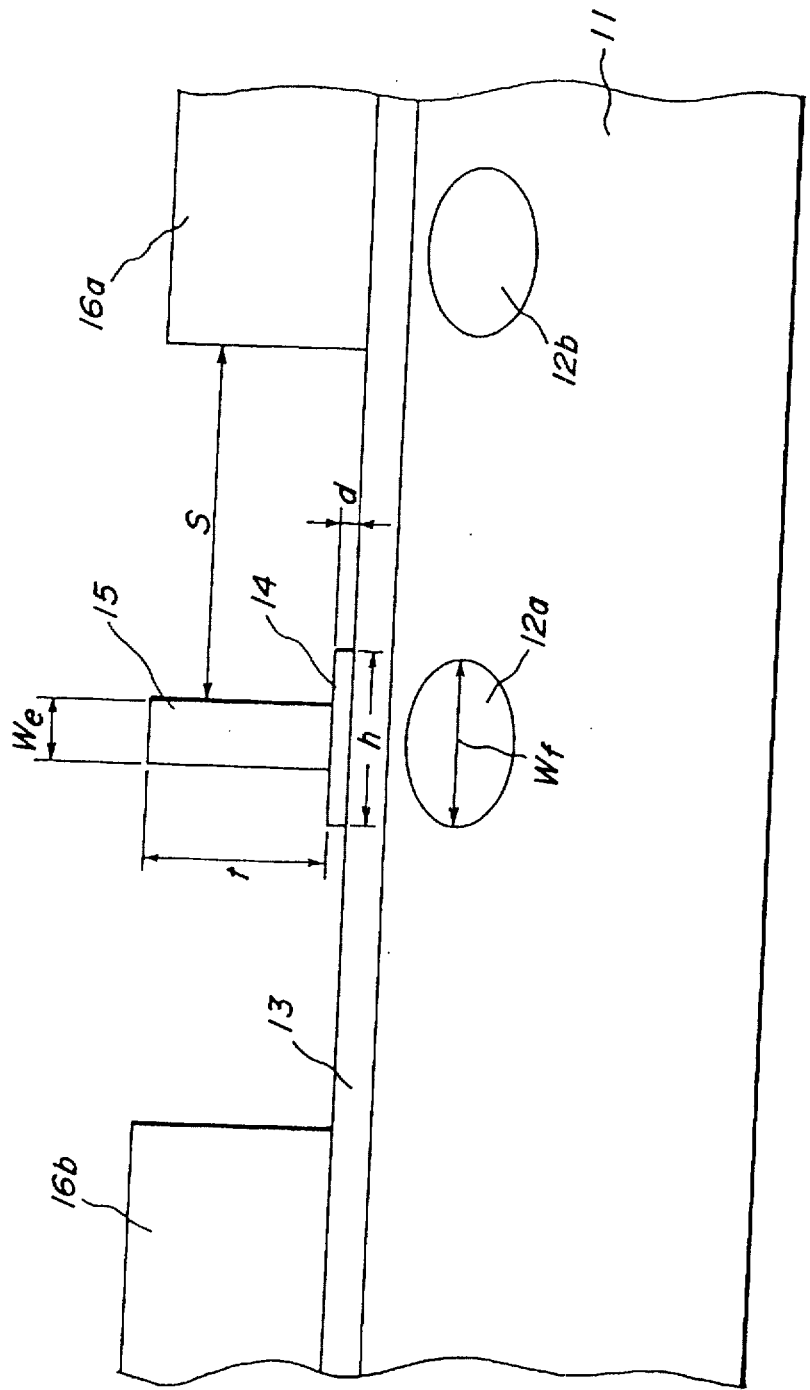
FIG. 7 is a schematic cross sectional view illustrating a first embodiment of the optical modulator according to the invention.

FIG. 7 is a schematic cross sectional view showing a first embodiment of the optical modulator according to the first aspect of the invention. In the present embodiment, the optical modulator is formed as the Mach-Zehnder type optical intensity modulator comprising two optical waveguides and traveling-wave type electrodes. The optical modulator comprises a substrate 11 formed by a Z-cut lithium niobate plate having an electrooptical effect. In a surface region of the substrate 11 there are formed optical waveguides 12a and 12b. These optical waveguides 12a and 12b are formed by depositing a titanium film having a thickness of 800 Å and then effecting a thermal diffusion at 1000° C. for ten hours. On the surface of the substrate 11, there is formed a buffer layer 13 for suppressing a lightwave absorption by metal electrodes. This buffer layer 13 is formed by a $SiO_2$ having a thickness of 1.0 μm and is formed by a sputtering process.

The optical modulator comprises an electric field adjusting region 14 provided on the buffer layer 13. The electric field adjusting region 14 is formed by applying a photo-resist by a spin coat process, providing a mask having an opening corresponding to the electric field adjusting region to be formed, exposing the photo-resist through the mask and developing the photo-resist to remove an exposed portion thereof, depositing Ti by a thickness d of 500 Å, and by removing the photo-resist. In this manner, the electric field adjusting region 14 can be formed by a lift-off method.

In the present embodiment, the electric field adjusting region 14 is made of Ti, but according to the invention, the electric field adjusting region may be made of other material than Ti. That is to say, according to the invention, the electric field adjusting region 14 is made of a material selected from the group consisting of Ti, Cr, Ni, Cu and Au or alloys thereof.

The electric field adjusting region 14 is formed to have a width h which is substantially equal to a width of lightwave propagating along the optical waveguide 12a. In the present embodiment, the electric field adjusting region 14 is made of Ti having a higher conductivity, and thus a width h of the region 14 is set to about 10 μm. The electric field adjusting region 14 may be made of a semiconductive material having a lower conductivity than metal. When the electric field adjusting region 14 is made of Si, the region is preferably formed to have a thickness d of 1000 Å and a width h of 20–30 μm.

When the electric field adjusting region 14 is made of a semiconductive material, thickness d and width h of the region may be varied over a wide range, because the conductivity of the semiconductive material may be adjusted widely by selecting impurity concentration, composition and manufacturing method. However, in such a case, it is necessary to use a much more precise manufacturing machine as well as a much more strict management in manufacture. The semiconductive material for the electric field adjusting region 14 may be selected from the group consisting of Ga, In, As, Al, B, Ce, Si, Sn and Sb and compounds thereof.

The optical modulator further comprises a hot electrode 15 and two ground electrodes 16a and 16b. The hot electrode 15 is provided above the first optical waveguide 12a, one of the ground electrodes 16a is provided above the second optical waveguide 12b and the other ground electrode 16b is arranged such that the ground electrodes are symmetrical with respect to the hot electrode 15.

The hot electrode 15 and ground electrodes 16a, 16b are formed by the electroplating method using the photo-resist. That is to say, after forming the electric field adjusting region 14, a photo-resist is applied on the surface, portions of the applied photo-resist corresponding to the electrodes 15, 16a and 16b are selectively removed, an electrode material such as Au is deposited by an electroplating to have a thickness t of 10 μm, and finally the photo-resist is removed.

Figure 8:
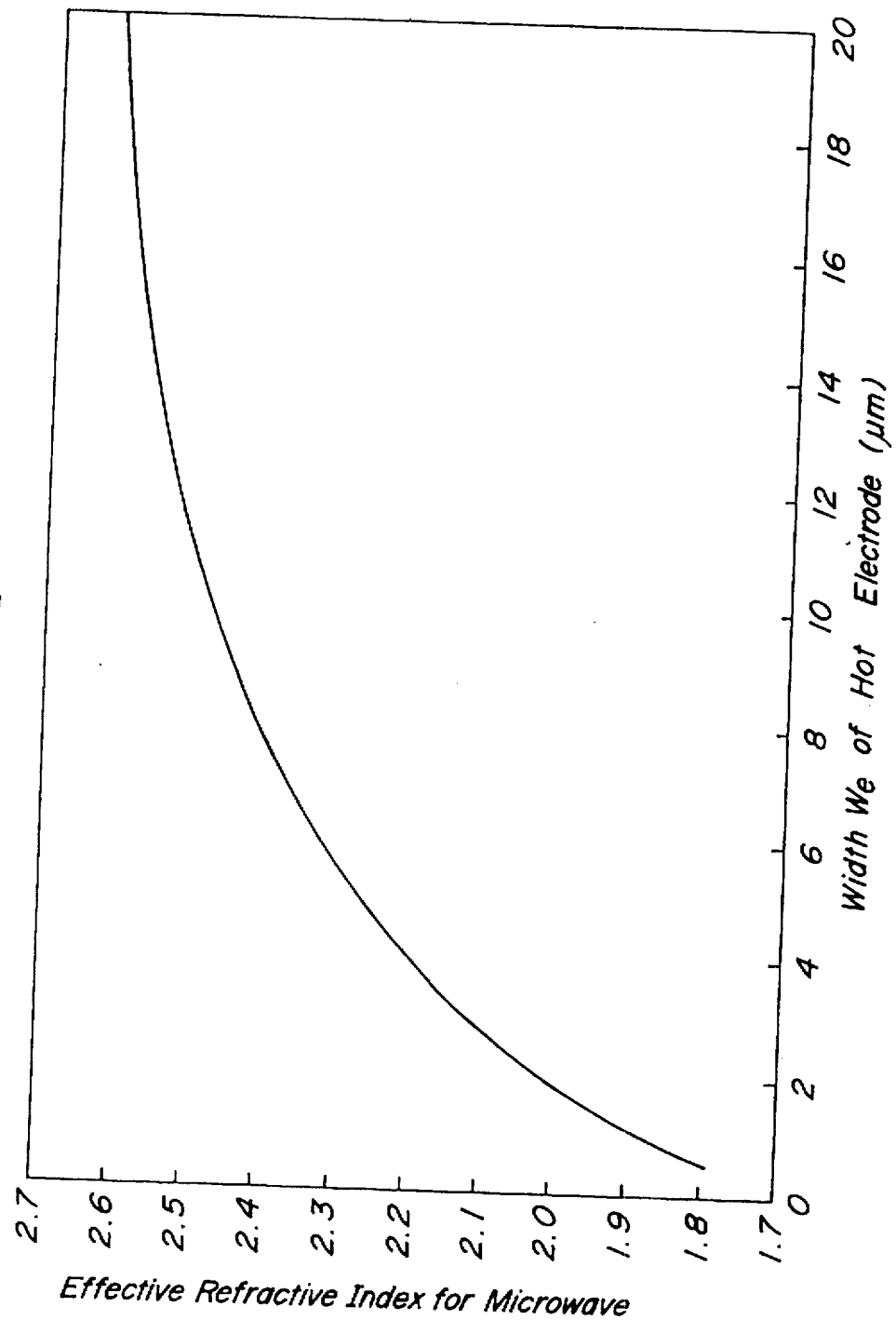
FIG. 8 is a graph representing a simulated relationship between a width of the hot electrode and an effective refractive index for the microwave.

The hot electrode 15 is formed to have such a width $W_e$ that an effective refractive index $n_m$ for the microwave is substantially identical with an effective refractive index no for the lightwave. In the present embodiment, the width $W_e$ of the hot electrode 15 is set to 5 μm which is smaller than a width $W_f$ of the optical waveguide 12a. Then, the effective refractive index for the microwave becomes about 2.2 as can be seen from a graph shown in FIG. 8. In FIG. 8, a horizontal axis denotes the width $W_e$ of the hot electrode 15 and a vertical axis represents the effective refractive index for the microwave. When the hot electrode has a width $W_e$ of 10–20 μm like as the known optical modulator, the effective refractive index $n_m$ for the microwave becomes about 2.5–2.6 which are larger than the effective refractive index 2.2 for the lightwave. In the present embodiment, the width $W_e$ of the hot electrode 15 is set to 5 μm, and thus the effective refractive index for the microwave is about 2.2 which is substantially equal to that for the lightwave propagating along the optical waveguides 12a and 12b. In this case, it is no more necessary to make the thickness t of the hot electrode 15 larger than an electrode spacing S. Therefore, it is possible to overcome the problems of the known optical modulator such as the peeling off of the hot electrode due to an internal stress of the thick metal deposition and the variation in the impedance of the optical modulator and in the effective refractive index for the microwave due to a poor reproducibility of the thick hot electrode.

Figure 9:
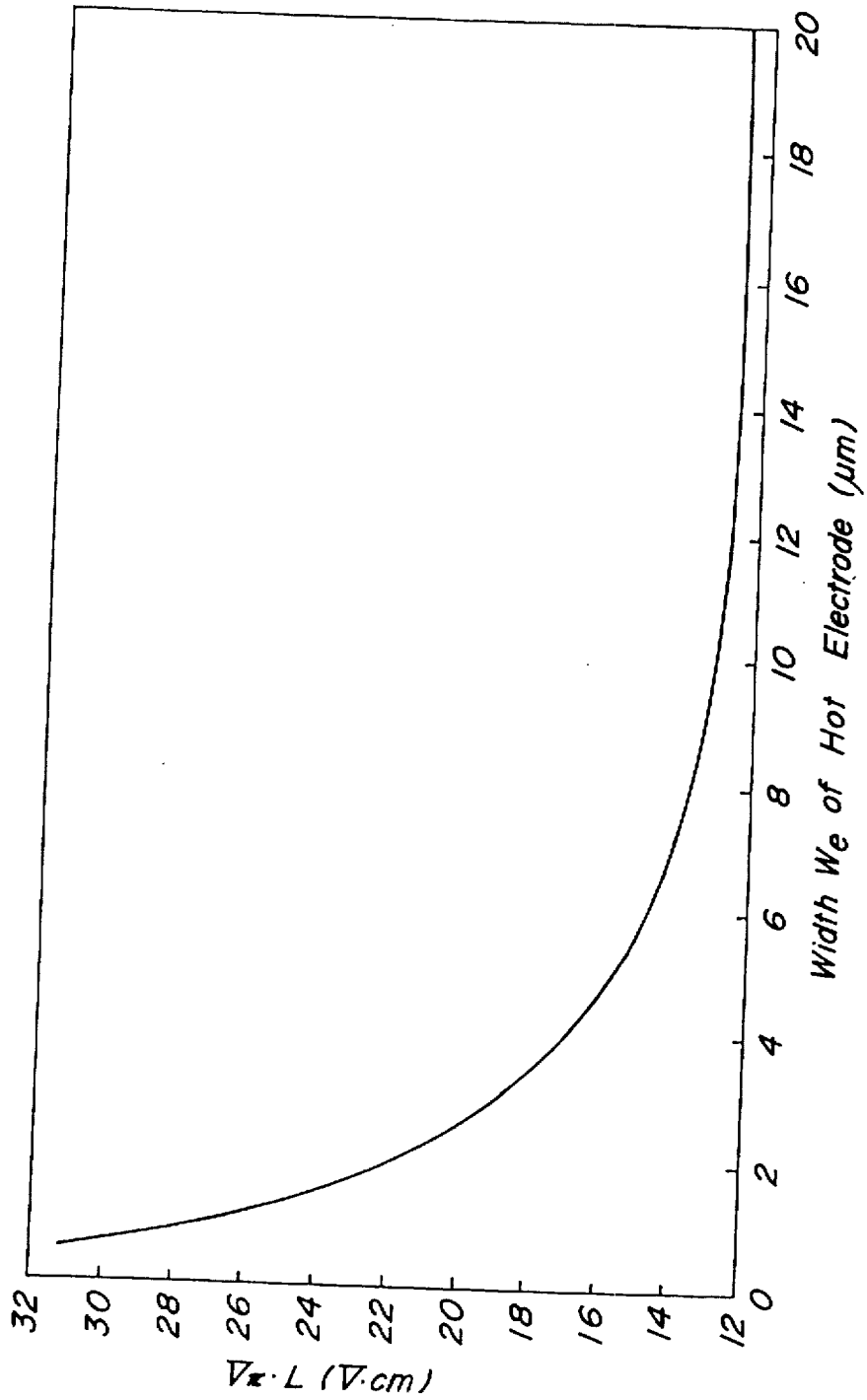
FIG. 9 is a graph expressing a simulated relationship between a width of the hot electrode and a driving voltage.
Figure 10:
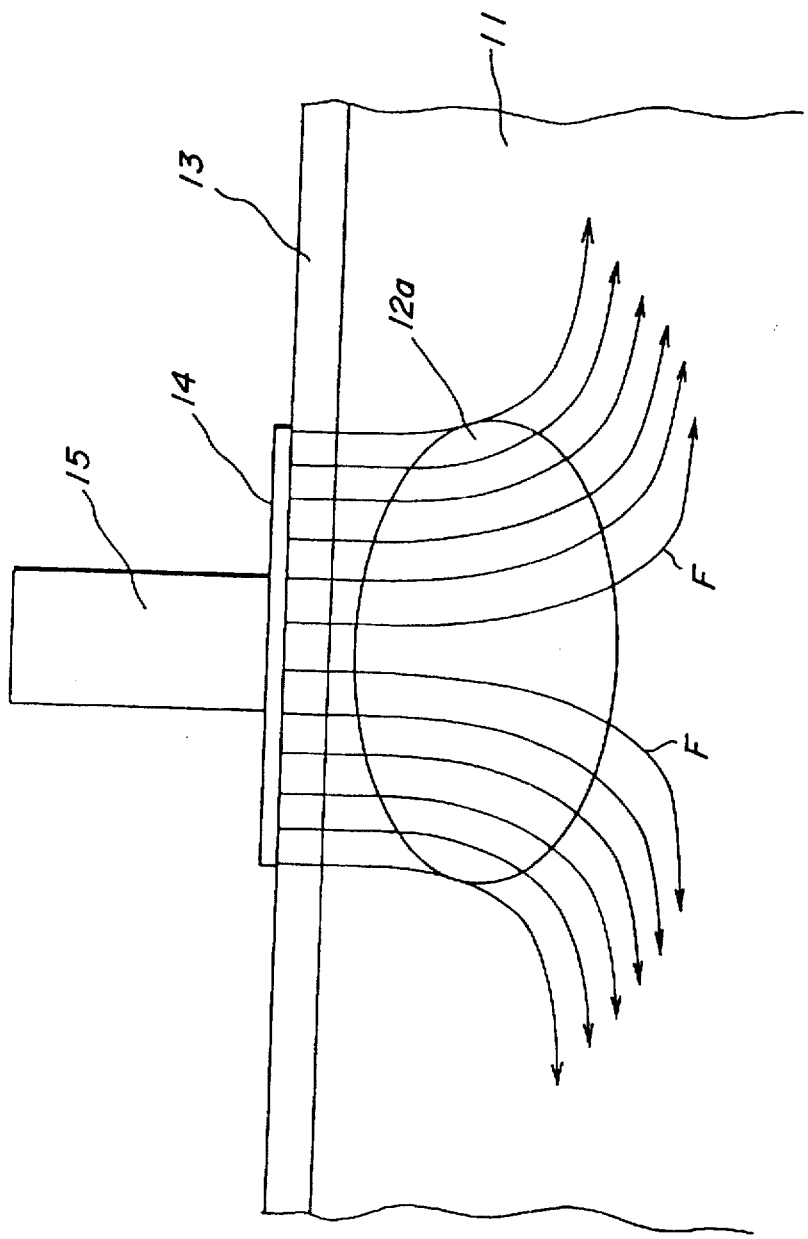
FIG. 10 is a schematic cross sectional view representing the distribution of the electric field in the optical modulator shown in FIG. 7.

In the Mach-Zehnder type optical intensity modulator having the very narrow hot electrode of the present embodiment, the velocity matching is attained between the microwave and the lightwave, and thus has a very wide modulation bandwidth. However, there occurs a problem that the driving voltage of the modulator becomes higher because of narrowly formed hot electrode as shown in FIG. 9. In FIG. 9, a horizontal axis represents the width $W_e$ of the hot electrode 15 and a vertical axis denotes a product of the half-wave voltage $V_\pi$, and a length L of the hot electrode. To overcome this problem, the present embodiment has a configuration that the electric field adjusting region 14 is made of a suitable material to have suitable thickness d and width h such that the characteristic impedance Z of the electrodes and effective refractive index $n_m$ for the microwave are not affected by the electric field adjusting region 14, and at the same time, the distribution of the electric field F generated by the microwave applied to the hot electrode 15 and the distribution in intensity of the lightwave propagating along the optical waveguides 12a and 12b are matched with each other as illustrated in FIG. 10, and therefore a very strong interaction can be attained between the microwave electric field and the lightwave. Therefore, the driving voltage can be lowered even though the hot electrode of the modulator is formed narrowly. According to the invention, an effective width $W_e$ of the hot electrode 15 is increased by the electric field adjusting region 14, and thus the driving voltage can be decreased.

Figure 11:
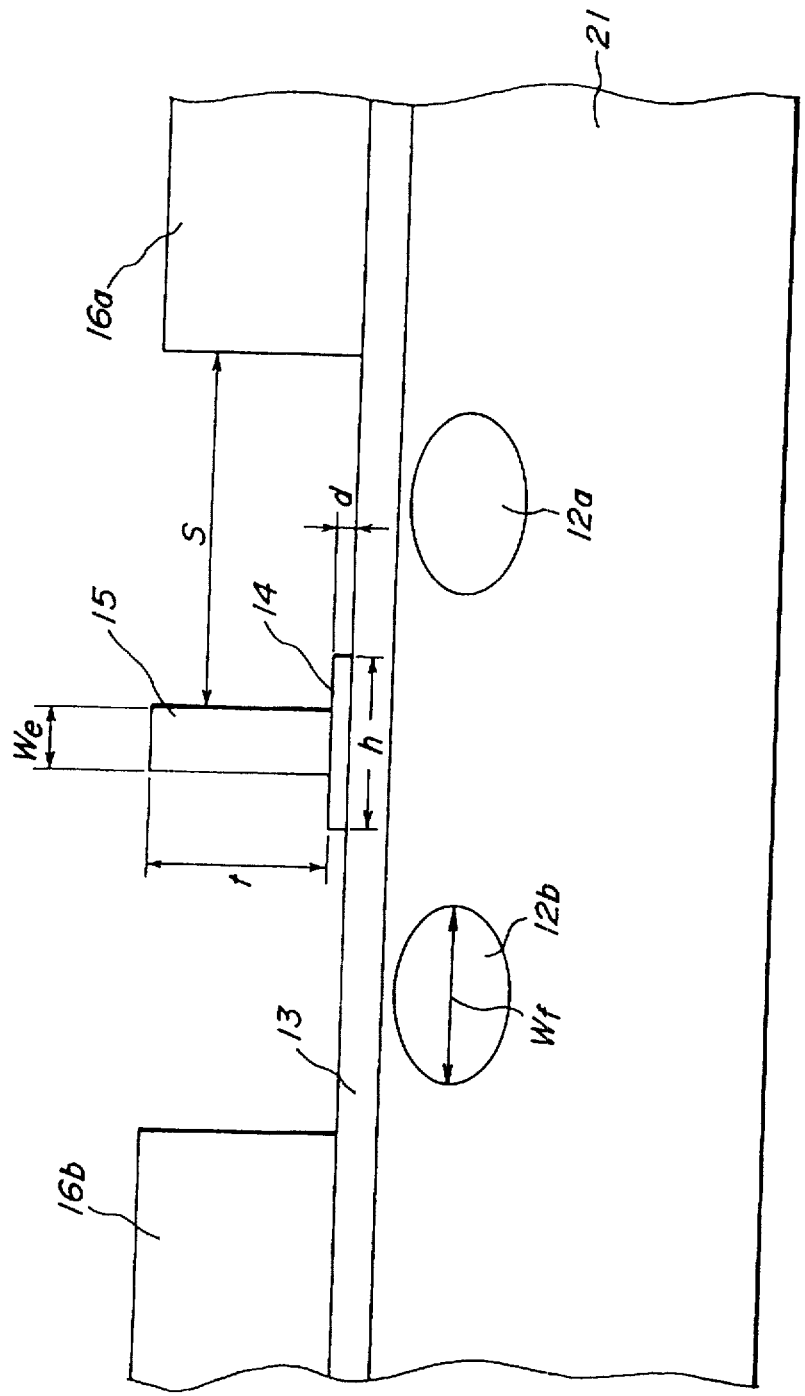
FIG. 11 is a cross sectional view illustrating a second embodiment of the optical modulator according to the invention.

FIG. 11 is a cross sectional view showing a second embodiment of the optical modulator according to the first aspect of the invention. The optical modulator of the present embodiment is also formed as the Mach-Zehnder type. In the present embodiment, use is made of an X-cut LN substrate 21 instead of the Z-cut LN substrate 11 used in the first embodiment. In the X-cut LN substrate 21, the maximum electrooptical constant $r_{33}$ appears horizontally, i.e. in parallel with the surface of the substrate. Therefore, the first and second optical waveguides 12a and 12b are arranged between the hot electrode 15 and the first and second ground electrodes 16a and 16b, respectively such that the electric field is horizontally applied to the lightwave propagating along the optical waveguides. The optical modulator of the present embodiment can be manufactured in a substantially same manner as that of the previous embodiment. However, in the present embodiment using the X-cut LN substrate 21, the electric field adjusting region 14 is formed to have a larger width h than that of the previous embodiment. That is to say, when the electric field adjusting region 14 is made of NiCr, the region has a width h of 15 μm and a thickness d of 500 Å. This is due to a fact that when the optical waveguides 12a and 12b are formed not under the electrodes 15 and 16a, but between the electrodes 15 and 16a, 16b, the interaction between the electric field and the lightwave can be enhanced by increasing the width h of the electric field adjusting region 14, and thus the driving voltage can be lowered.

When the electric field adjusting region 14 is made of a semiconductive material such as Si, it is preferable to set a thickness d and a width h of the region 14 to 1000 Å and 30–40 μm, respectively. In any case, a width $W_e$ of the hot electrode 15 is set to 5 μm which is smaller than a width $W_f$ of the optical waveguides 12a and 12b.

According to the invention, it has been experimentally confirmed that a thickness d of the electric field adjusting region 14 is preferably set to a value within a range from 150 Å to 1 μm, and a width h of the electric field adjusting region 14 is preferably set to a value within a range from 2 μm to a smaller value than a sum of twice of the electrode spacing S and width $W_e$ of the hot electrode 15.

Figure 12:
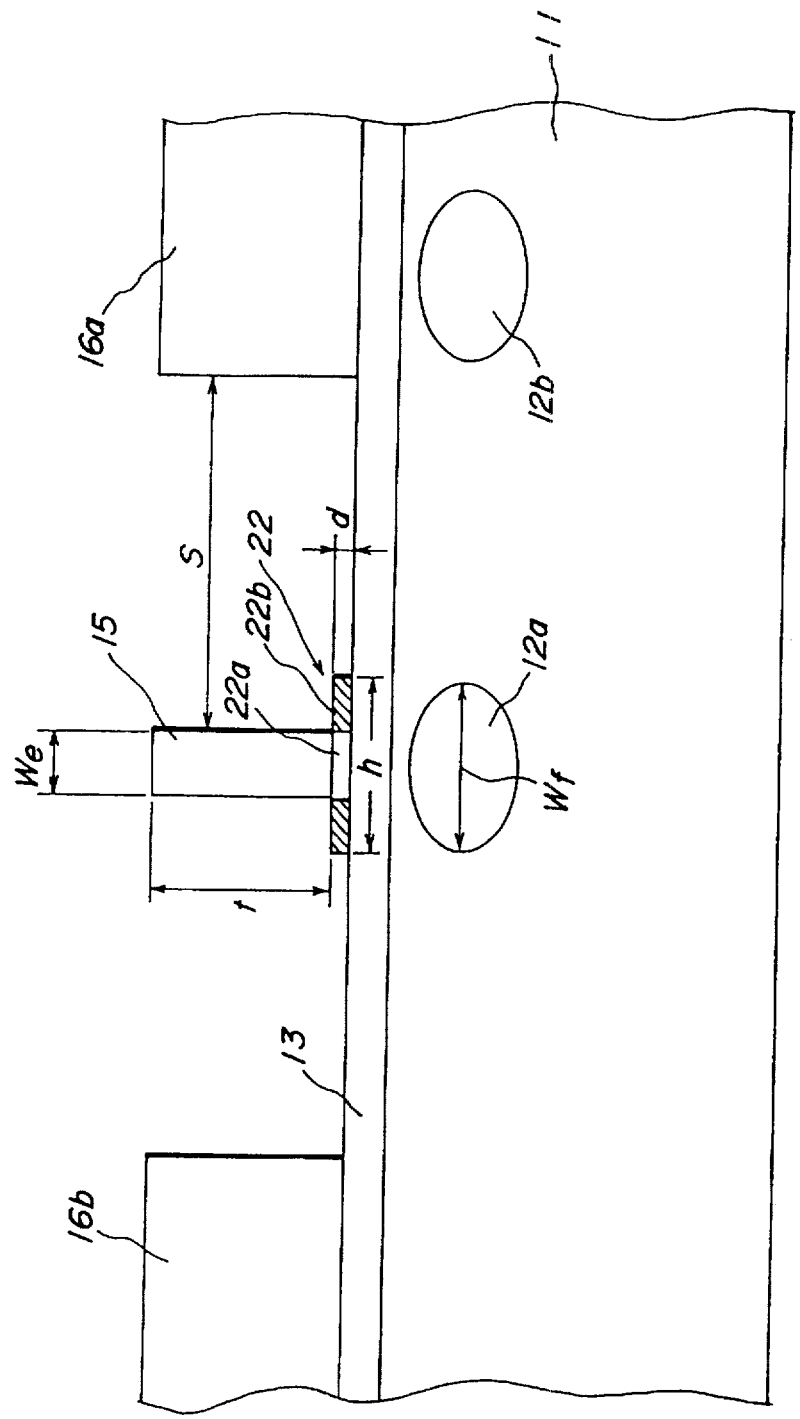
FIG. 12 is a cross sectional view showing a third embodiment of the optical modulator according to the invention.

FIG. 12 is a cross sectional view showing a third embodiment of the optical modulator according to the first aspect of the invention. The optical modulator of the present embodiment is of the Mach-Zehnder type and the Z-cut LN plate is used as a substrate 11 like as the first embodiment, and therefore, first and second optical waveguides 12a and 12b are formed under hot electrode 15 and first ground electrode 16a, respectively. According to the aspect of the invention, an electric field adjusting region 22 provided between the buffer layer 13 and the hot electrode 15 is formed to have a non-uniform distribution in conductivity viewed in a direction parallel with the surface of the substrate 11. In the present embodiment, the electric field adjusting region 22 is consisting of a central portion 22a and a peripheral portion 22b, said central portion 22a being made of a material having a higher conductivity than a material of which the peripheral portion 22b is made. That is to say, the central portion 22a of the electric field adjusting region 22 is made of NiCr and the peripheral portion 22b is made of Ti, NiCr having a higher conductivity than Ti.

Figure 2:
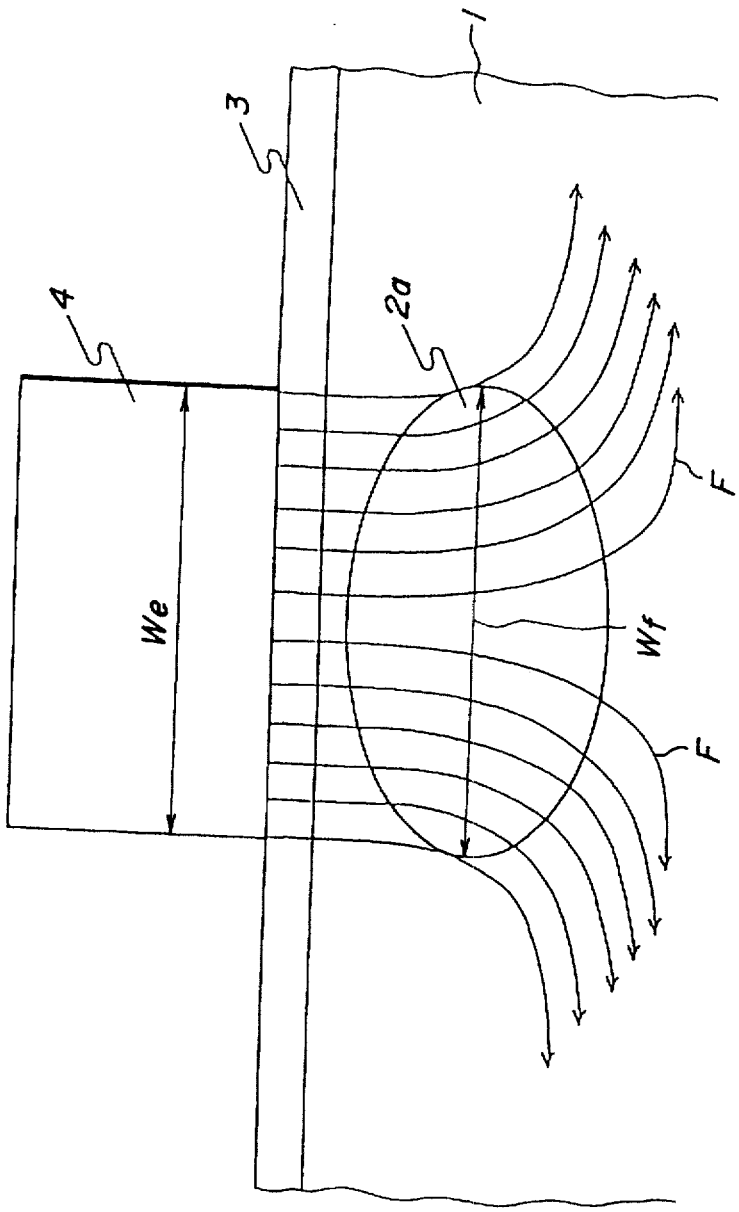
FIG. 2 is a schematic cross sectional view illustrating the distribution of the electric field with respect to the optical waveguides in the known optical modulator shown in FIG. 1.
Figure 3:
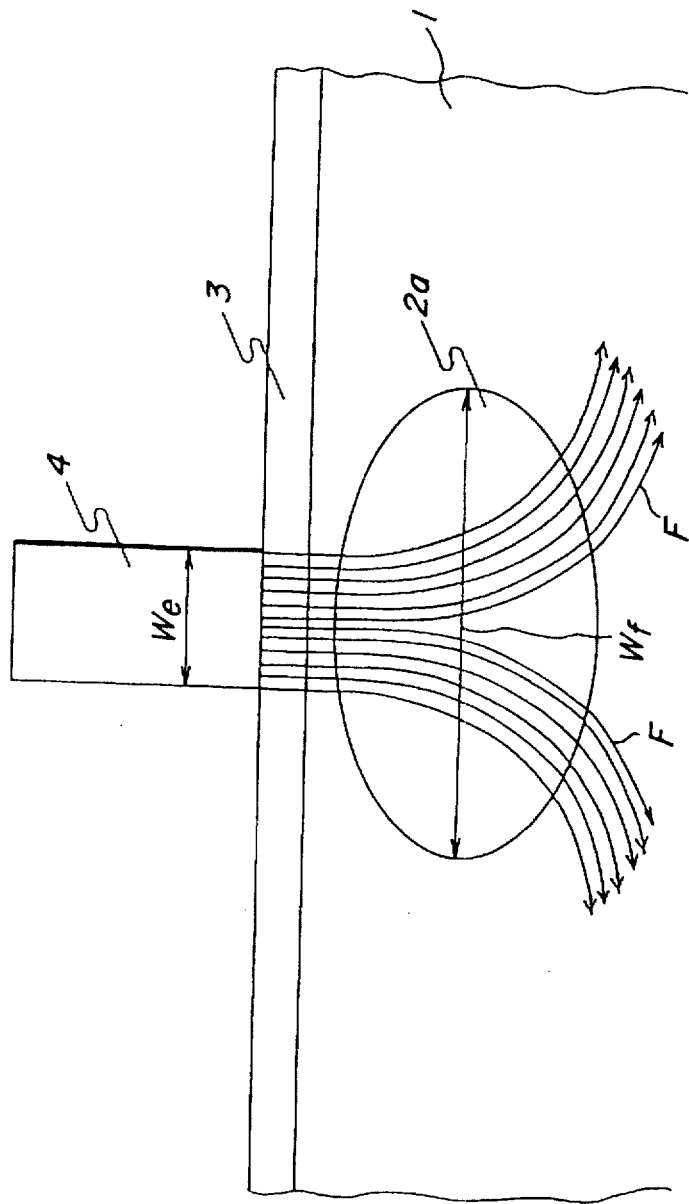
FIG. 3 is a schematic cross sectional view depicting the distribution of the electric field in another known optical modulator of waveguide type.
Figure 4:
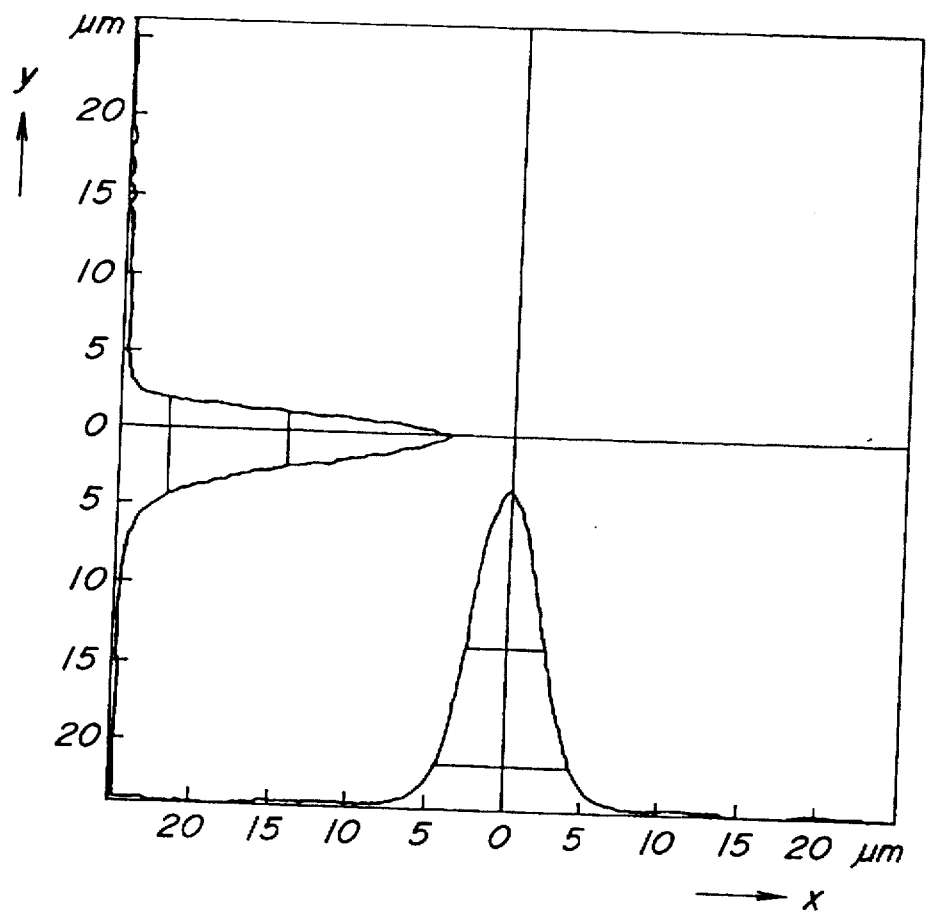
FIG. 4 is a typical profile illustrating an intensity distribution of the lightwave propagating along the optical waveguide in the known optical modulator.
Figure 5:
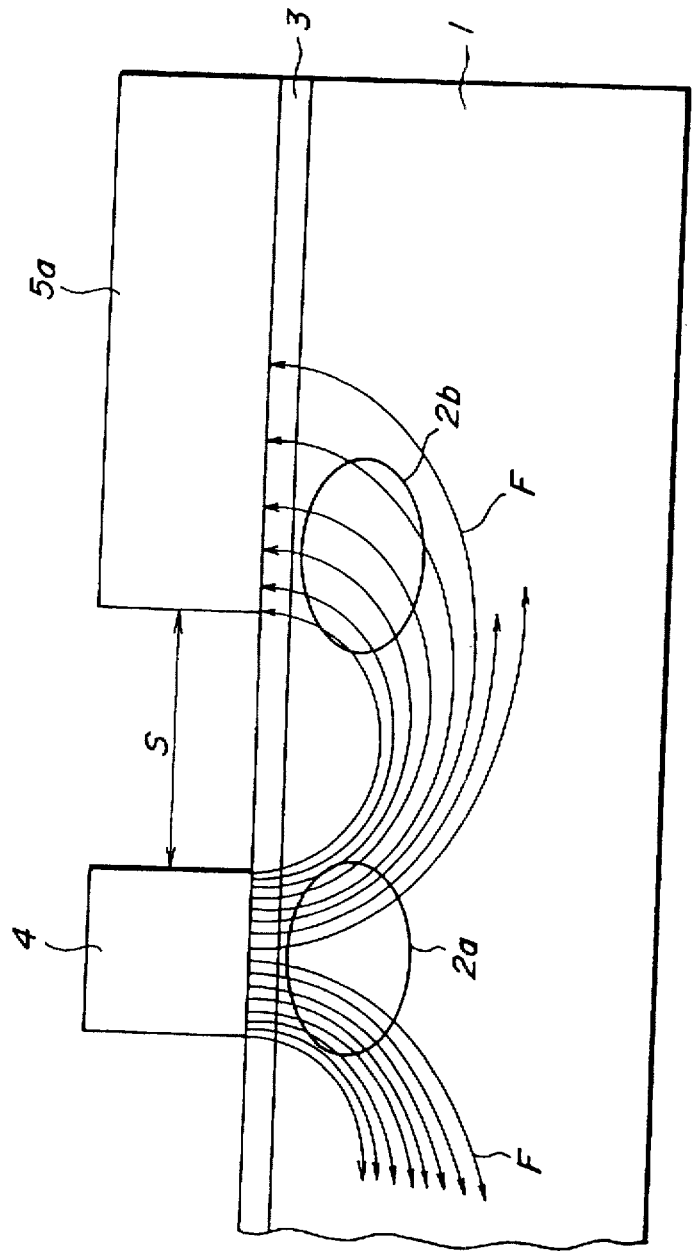
FIG. 5 is a schematic cross sectional view showing the distribution of the electric field in the known optical modulator.
Figure 6:
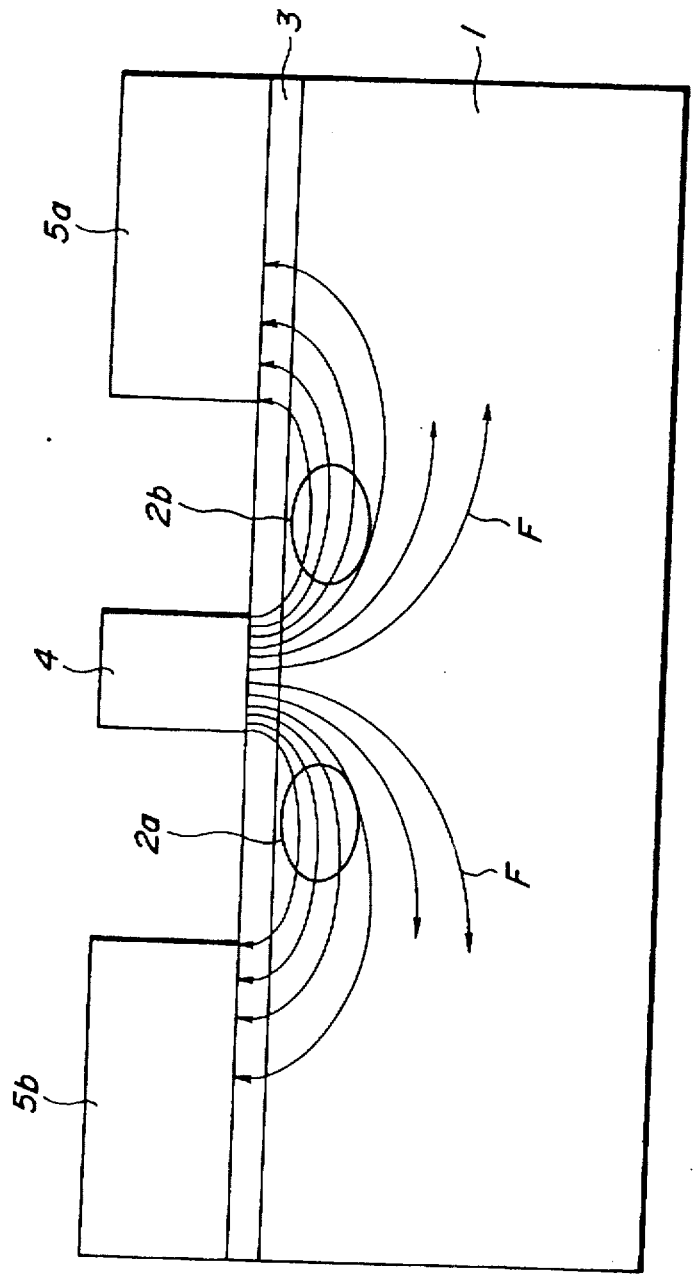
FIG. 6 is a schematic cross sectional view depicting the distribution of the electric field in another known optical modulator.
Figure 13:
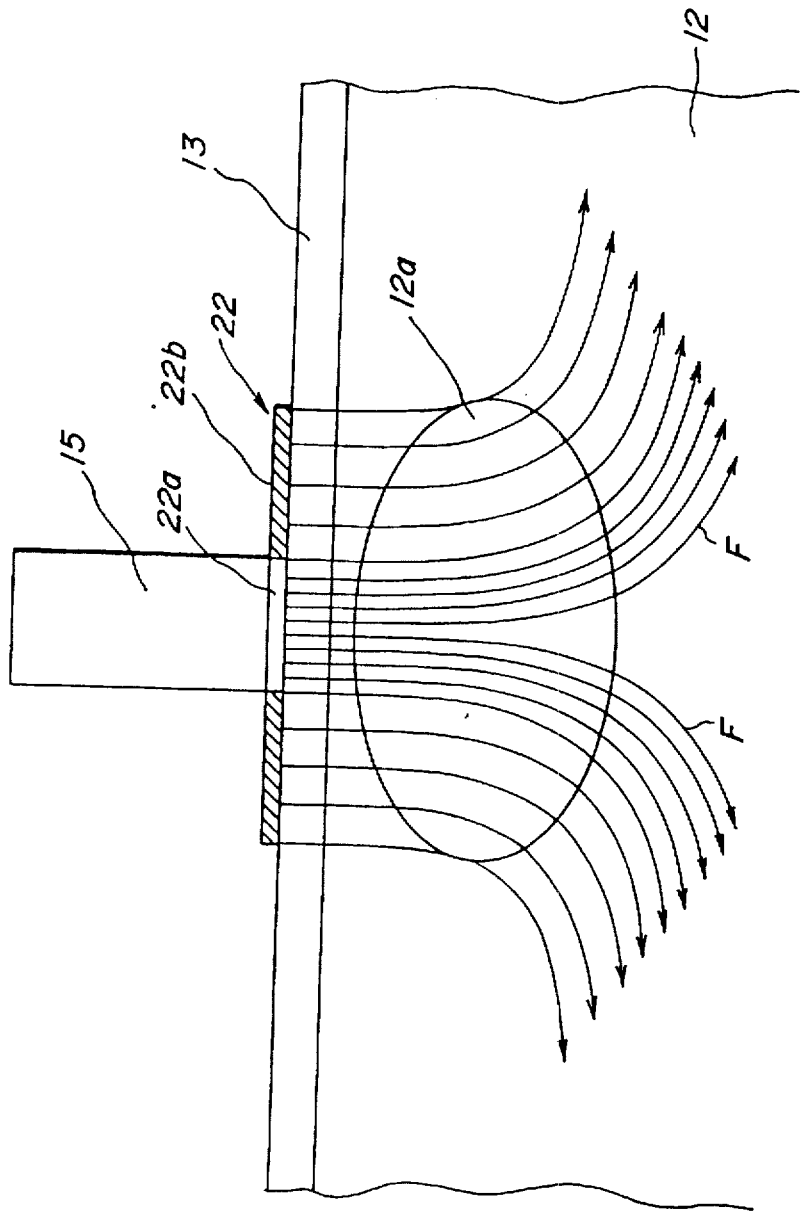
FIG. 13 is an enlarged cross sectional view of a hot electrode portion of FIG. 12.

Then, as illustrated in FIG. 13, the density of the electric field F generated in the vicinity of the hot electrode becomes higher at the central area and becomes lower at the peripheral area. On the other hand, the intensity distribution of lightwave propagating along the optical waveguide has the Gaussian profile in which the intensity of lightwave becomes to be weakened from the center of the intensity distribution towards the periphery as shown in FIG. 4. Therefore, the electric field can be much more effectively interacted with the lightwave propagating along the optical waveguide 12a, and thus the driving voltage can be further deceased.

The electric field adjusting region 22 having the central portion 22a and peripheral portion 22b made of different materials may be manufactured in the following manner. After forming the buffer layer 13 on the substrate 11, a first photo-resist pattern having an opening at position corresponding to the central portion 22a is formed, and a NiCr film having a thickness of 1000 Å is deposited by a vacuum evaporation. Then, the first photo-resist pattern is removed to form the central portion 22a having a width of 5 μm. Next, a second photo-resist pattern having an opening at position corresponding to the peripheral portion 22b is formed and a Ti film having a thickness of 1000 Å is deposited by sputtering. After that, the second photo-resist pattern is removed to form the peripheral portion 22b having a width of 10 μm. In this manner, the central portion 22a and peripheral portion 22b of the electric field adjusting region 22 can be easily and precisely formed by the lift-off method. Then, a third photo-resist pattern having openings at positions corresponding to the hot electrode 15 and ground electrodes 16a, 16b is formed, and an Au film having a thickness of 10 μm is deposited by an electroplating. Finally, the third photo-resist pattern is removed to form the hot electrode 15 and ground electrodes 16a, 16b. It should be noted that the hot electrode 15 has a width $W_e$ of 5 μm smaller than a width $W_f$ of the optical waveguide 12a.

Figure 14:
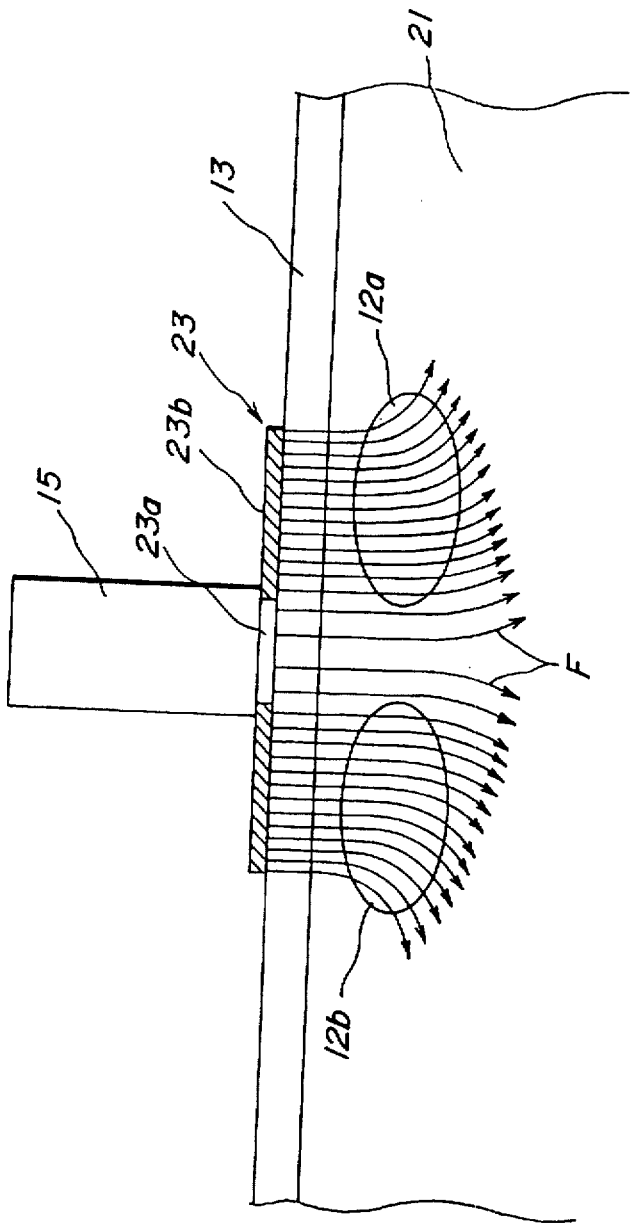
FIG. 14 is a cross sectional view depicting a fourth embodiment of the optical modulator according to the invention.

FIG. 14 is a fourth embodiment of the optical modulator according to the first aspect of the invention. In the present embodiment, a substrate 21 is formed by an X-cut LN plate and thus first and second optical waveguides 12a and 12b are formed at off-set positions with respect to the hot electrode 15 like as the second embodiment illustrated in FIG. 11. Also in the present embodiment, an electric field adjusting region 23 is consisting of a central portion 23a made of Si and a peripheral portion 23b made of NiCr. That is to say, in the present embodiment, the central portion 23a has a lower conductivity than the peripheral portion 23b. Furthermore, a width of the central portion 23a is set to 4 μm which is smaller than a width of the hot electrode 15 of 5 μm. The peripheral portion 23b has a width of 10 μm and is formed to extend partially underneath the hot electrode 15. Then, the peripheral portion 23b of the electric field adjusting region 23 is brought in to direct contact with the hot electrode 15. Therefore, the electric field F generated in the vicinity of the hot electrode is effectively interacted with the lightwave propagating along the optical waveguides 12a and 12b as depicted in FIG. 14, and thus the driving voltage can be reduced.

Figure 15:
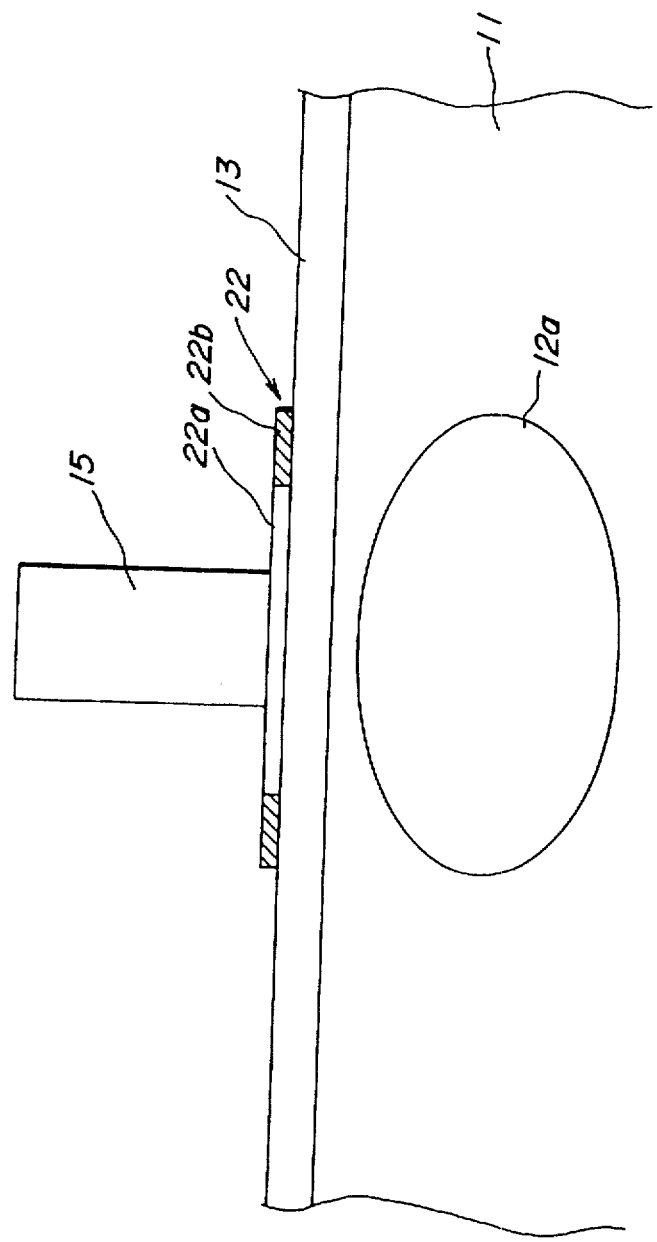
FIG. 15 is a cross sectional view illustrating a main portion of a fifth embodiment of the optical modulator according to the invention.

FIG. 15 is a cross sectional view showing a main portion of a fifth embodiment of the optical modulator according to the first aspect of the invention. In the present embodiment, use is made of a Z-cut LN substrate 11 and an electric field adjusting region 22 is formed by a central portion 22a having a width larger than that of the hot electrode 15 and a peripheral portion 22b made of a material having a lower conductivity than that of the material of the central portion 22a. Also in the present embodiment, the electric field can be effectively interacted with the lightwave propagating along the optical waveguide 12a, and thus the driving voltage can be decreased.

Figure 16:
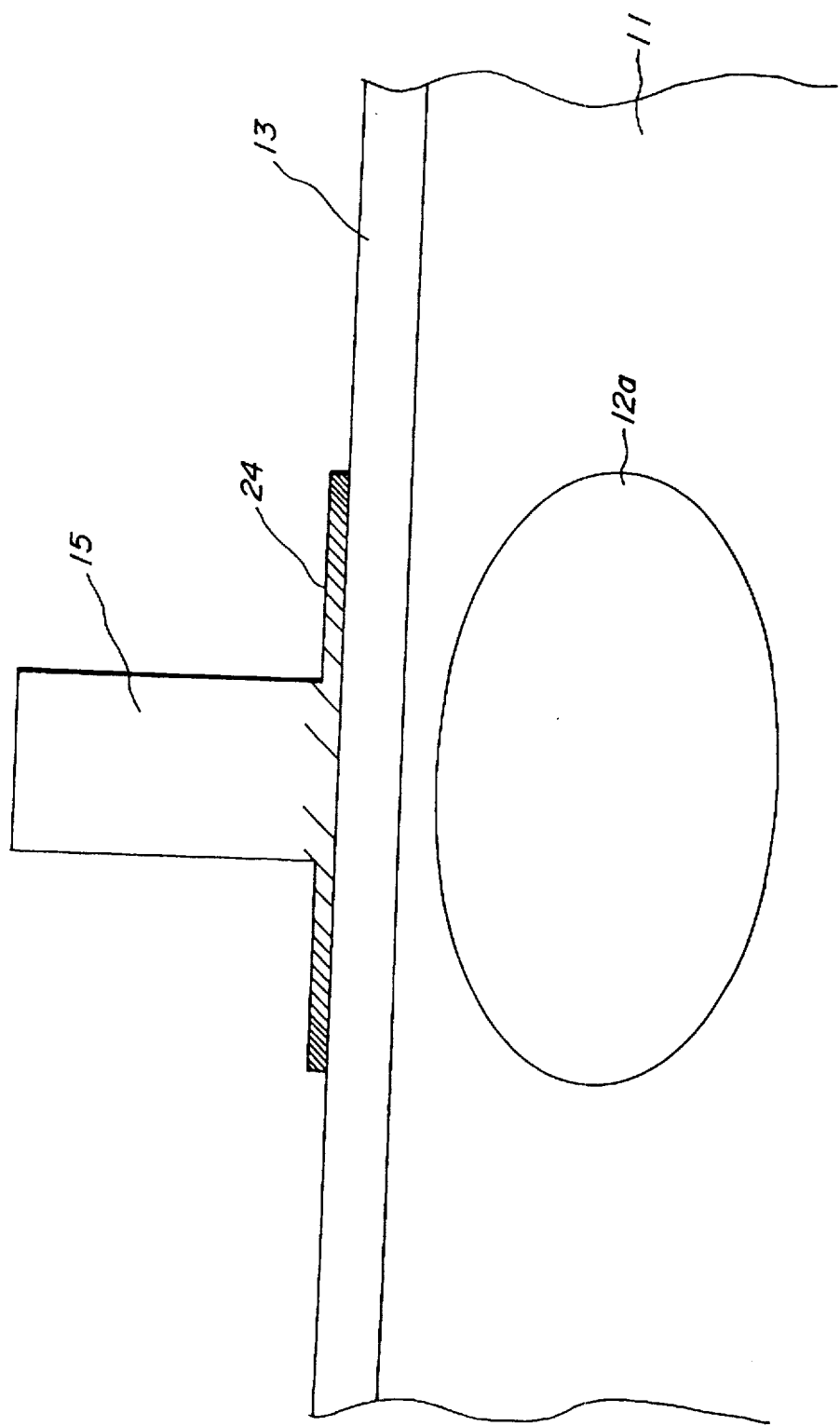
FIG. 16 is a cross sectional view showing a main portion of a sixth embodiment of the optical modulator according to the invention.

FIG. 16 is a cross sectional view showing a sixth embodiment of the optical modulator according to the first aspect of the invention. In the embodiments depicted in FIGS. 12–15, the electric field adjusting region is formed such that the conductivity is changed in a stepwise manner viewed in the direction of a width thereof. However, in the present embodiment, an electric field adjusting region 24 is formed to have a distribution in conductivity which is gradually changed in the direction of a width thereof. By suitably selecting the distribution in conductivity of the electric field adjusting region 24, it is possible to further enhance the interaction between the electric field and the lightwave, and therefore the driving voltage can be further decreased.

Figure 17:
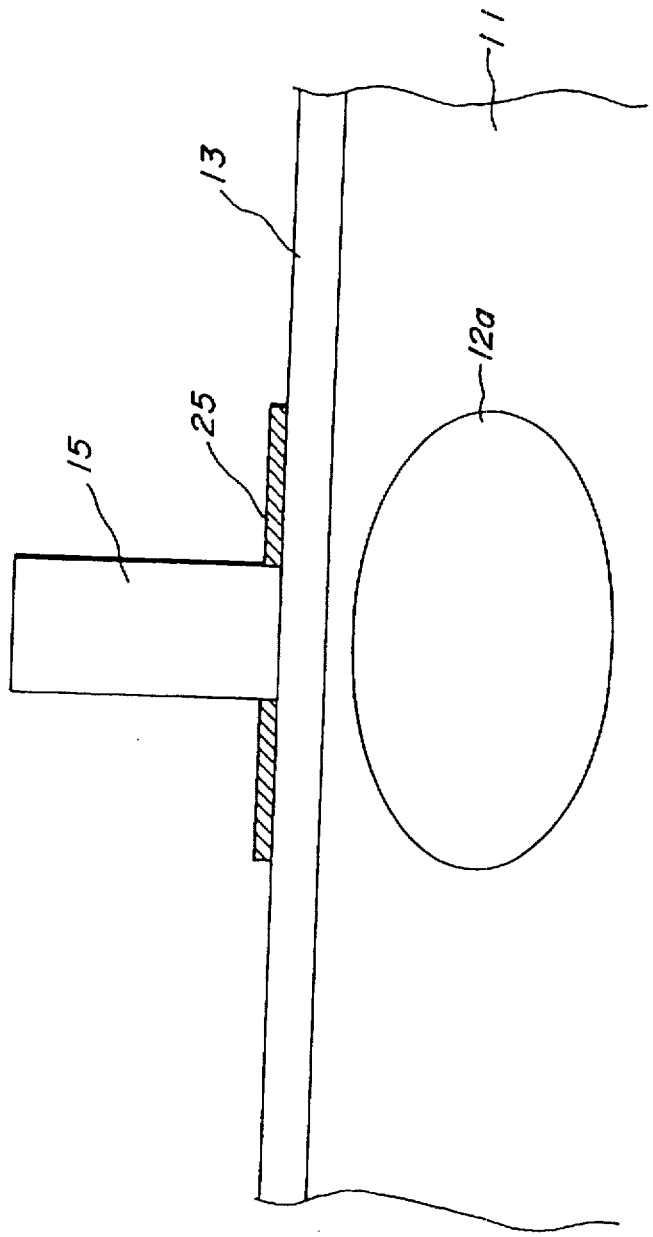
FIG. 17 is a cross sectional view for explaining a method of manufacturing the optical modulator shown in FIG. 16.

Now an example of a method of manufacturing the electric field adjusting region 24 having the continuously changing distribution in conductivity will be explained. At first, as depicted in FIG. 17, a Si film 25 having thickness of 1000 Å and width of 10 μm is formed on both sides of a hot electrode 15 made of Au. Then, an assembly is heated at about 350° C. for three hours to form an alloy of Si and Au. In this manner, the electric field adjusting region 24 having the continuously changing conductivity can be obtained. In this case, a central portion of the region 24 has a higher conductivity than a peripheral portion.

In general, it is difficult to form a film having a continuously changing conductivity viewed in a direction parallel with a surface thereof. In the above explained method, such a film can be easily formed by utilizing the alloying process. In this case, a configuration of the distribution of conductivity can be adjusted by changing alloying temperature and time in accordance with position and width of the optical waveguide within the substrate.

In the above embodiment, the electric field adjusting region 24 having the continuously varying distribution in conductivity is formed by the alloy of the metal and semiconductor, but according to the invention, such a region may be formed by an alloy of different kinds of metals.

Figure 18:
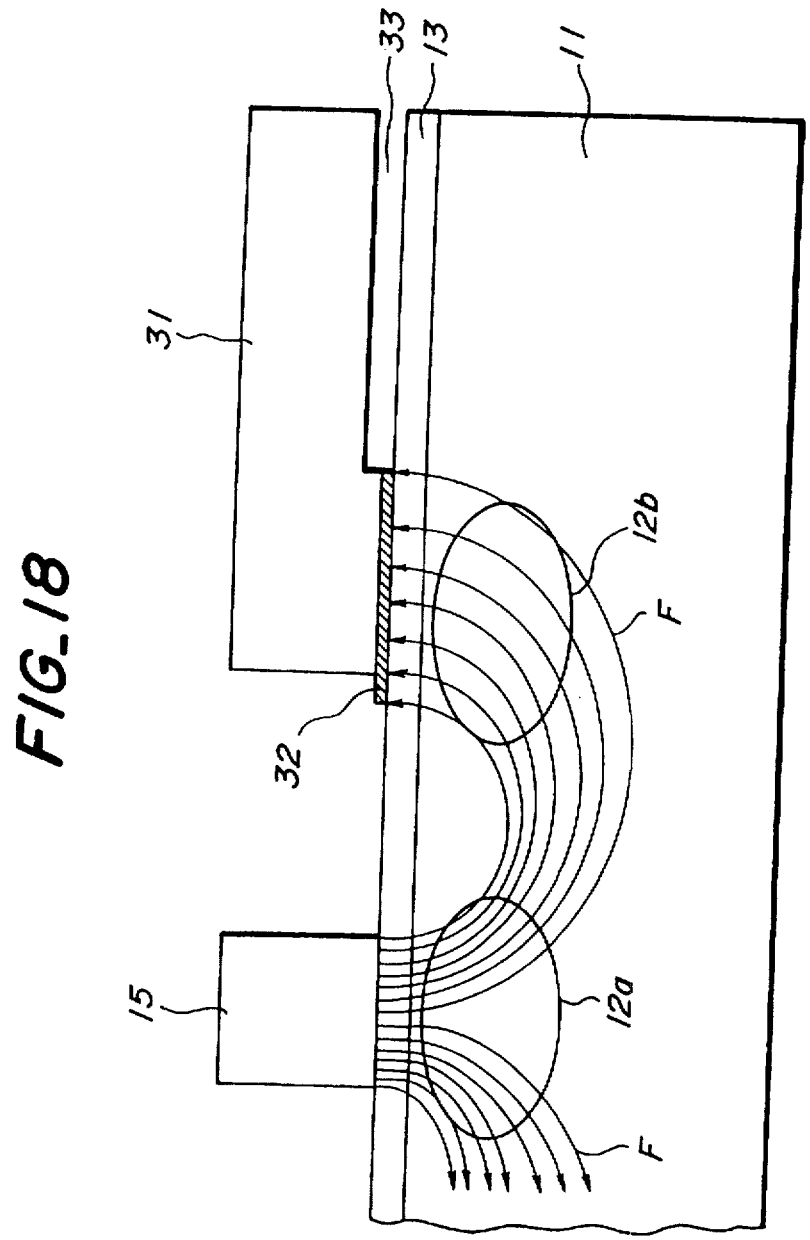
FIG. 18 is a schematic cross sectional view depicting a seventh embodiment of the optical modulator according to the invention.

FIG. 18 is a schematic cross sectional view illustrating a seventh embodiment of the optical modulator according to the second aspect of the invention. The optical modulator of the present embodiment is formed as a Mach-Zehnder type optical intensity modulator comprising a Z-cut LN substrate 11 having formed therein first and second optical waveguides 12a and 12b, a buffer layer 13, a hot electrode 15 and a ground electrode 31. According to the second aspect of the instant invention, between the buffer layer and the ground electrode 31, there are formed ground side electric field adjusting main- and sub-regions 32 and 33, which are aligned in the direction of width of the electrode. In the present embodiment, the ground side electric field adjusting main-region 32 is formed by a NiCr film having a thickness of 500 Å. The ground side electric field adjusting sub-region 33 is formed by an air gap. A sufficient function may be attained by the very thin air gap 33, but in view of manufacturing, it is preferable to set a thickness of the air gap not smaller than 0.1 μm. Since the air gap 33 has a lower dielectric constant than the buffer layer 13, the effective refractive index for the microwave can be advantageously influenced by the air gap. A width and a position of the NiCr film 32 serving as the ground side electric field adjusting main-region and a width of the air gap 33 serving as the ground side electric field adjusting sub-region are determined such that the electric field F can be interacted with the lightwave propagating along the optical waveguide 12b in the most effective manner.

Figure 19:
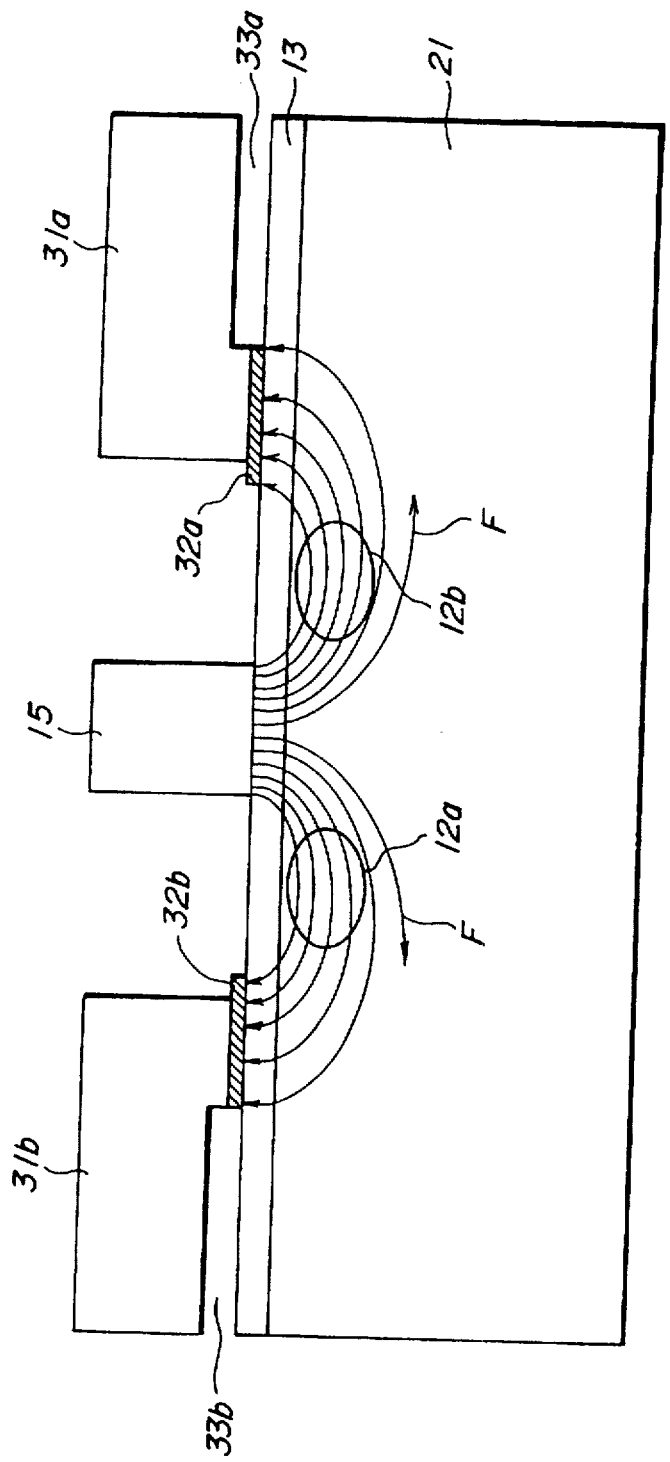
FIG. 19 is a schematic cross sectional view illustrating an eighth embodiment of the optical modulator according to the invention.

FIG. 19 is a schematic cross sectional view showing an eighth embodiment of the optical modulator according to the second aspect of the invention. In the present embodiment, a substrate 21 is formed by an X-cut LN plate, and thus first and second optical waveguides 12a and 12b are formed between a hot electrode 15 and first and second ground electrodes 31a and 31b, respectively. Between a buffer layer 13 and the first and second ground electrodes 31a and 31b are provided first and second NiCr films 32a and 32b serving as the ground side electric field adjusting main-region, and first and second air gaps 33a and 33b serving as the ground side electric field adjusting sub-region. Also in the present embodiment, the interaction between the electric field F and the lightwave propagating along the optical waveguides 12a and 12b can be enhanced, so that the driving voltage can be reduced.

Figure 20:
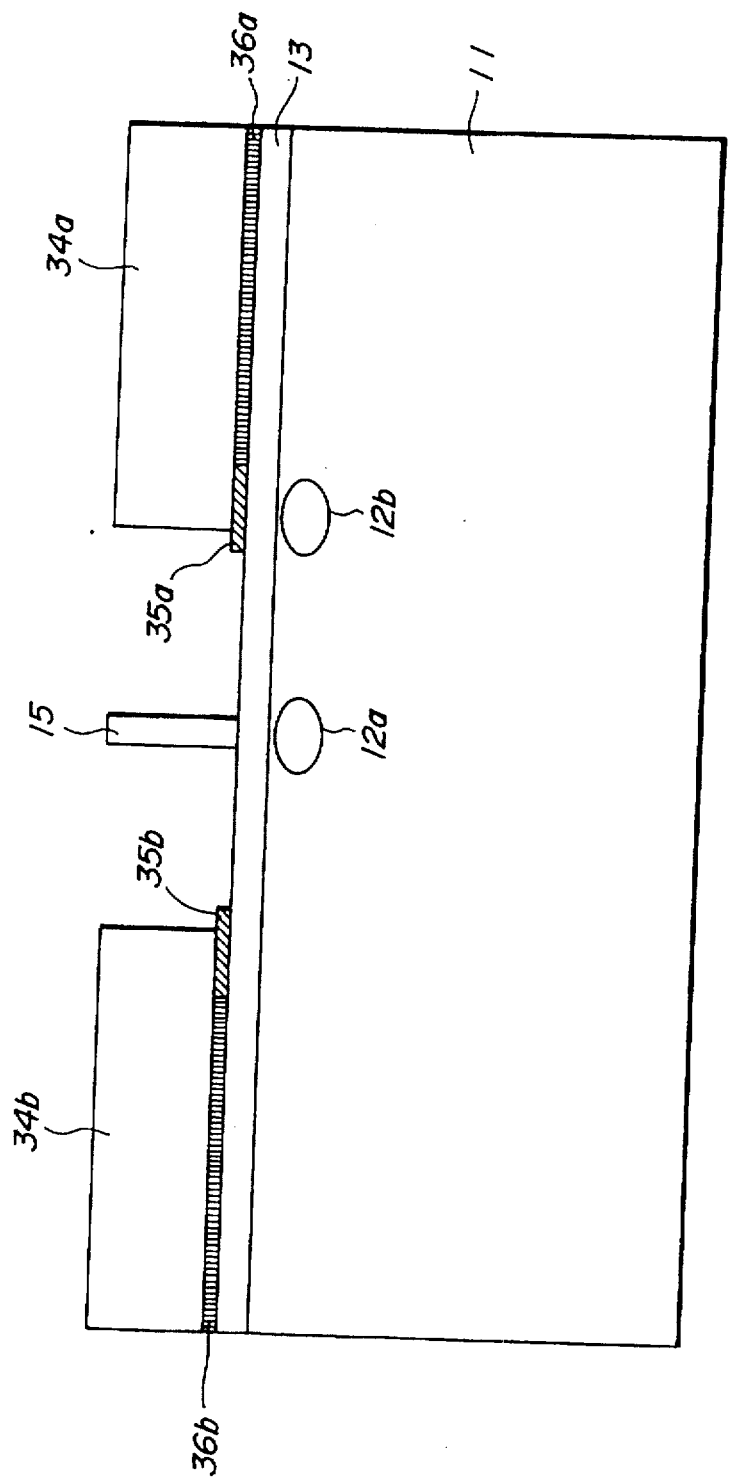
FIG. 20 is a cross sectional view showing a ninth embodiment of the optical modulator according to the invention.

FIG. 20 is a cross sectional view depicting a ninth embodiment of the optical modulator according to the second aspect of the invention. In the present embodiment, a Z-cut LN substrate 11 is used, and thus first and second optical waveguides 12a and 12b are formed under hot electrode 15 and first ground electrode 34a, respectively. A second ground electrode 34b is formed at opposite side to the first ground electrode 34a with respect to the hot electrode 15.

In the present embodiment, between the buffer layer 13 and the first and second ground electrodes 34a and 34b, there are formed first and second ground side electric field adjusting main-regions 35a and 35b as well as first and second ground side electric field adjusting sub-regions 36a and 36b. Each of the first and second ground side electric field adjusting main-regions 35a and 35b are consisting of a NiCr film having a thickness of 500 Å and a width of 10 μm which is substantially equal to a width of the optical waveguide 12b. Each of the first and second ground side electric field adjusting sub-regions 36a and 36b are consisting of a Ti film having a thickness of 500 Å and a width of 300 μm. These regions 35a, 35b, 36a and 36b may be manufactured by the lift-off method using photo-resist patterns. The hot electrode 15 and ground electrodes 34a and 34b are formed by an Au film having a thickness of 10 μm. These electrodes may be formed by using the electroplating process. It should be noted that the hot electrode 15 has a width of 5 μm which is smaller than a width of the optical waveguide 12a such that desired velocity matching between the microwave and the lightwave can be attained.

In the optical modulator using the Z-cut LN substrate 11, the improvement of the interaction between the microwave electric field and the lightwave propagating along the optical waveguide 12b can be attained by providing only the ground side electric field adjusting main- and sub-regions 35a and 36a underneath the first ground electrode 34a. However, in order to improve the frequency characteristic at a high frequency and temperature property, a cross section of the optical modulator preferably has a symmetrical construction, and therefore it is preferable to provided the second ground side electric field adjusting main- and sub-regions 35b and 36b underneath the second ground electrode 34b as shown in FIG. 20.

NiCr of the ground side electric field adjusting main-region 35a has a higher conductivity than Ti of the ground side electric field adjusting sub-region 36a, and thus the electric field intensity becomes higher at the ground side electric field adjusting main-region 35a. Therefore, the interaction between the electric field and the lightwave propagating along the optical waveguide 12b is enhanced.

Figure 21:
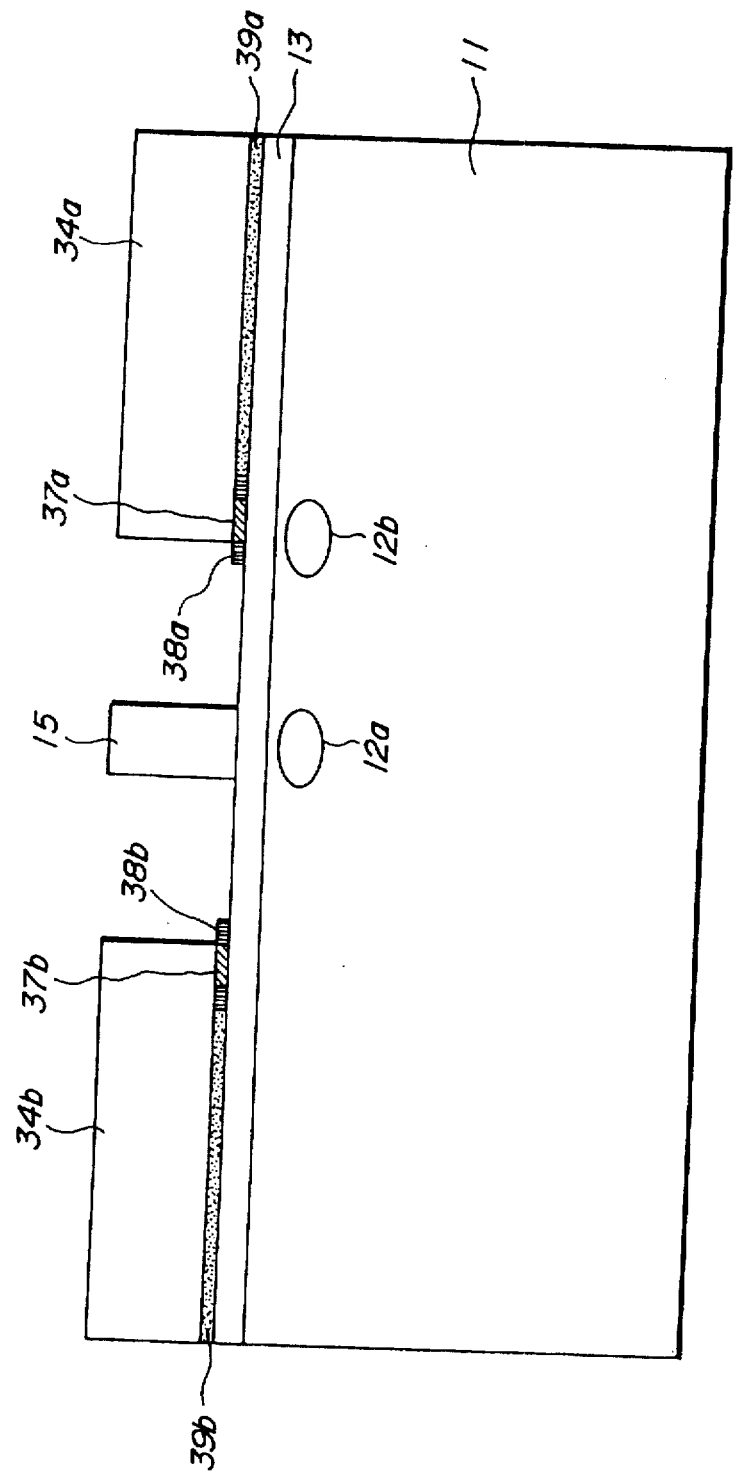
FIG. 21 is a cross sectional view illustrating a tenth embodiment of the optical modulator according to the invention.

FIG. 21 is a cross sectional view showing a tenth embodiment of the optical modulator according to the second aspect of the invention. In the present embodiment, each of first and second ground side electric field adjusting main-regions are consisting of a central portion 37a, 37b made of NiCr and a peripheral portion 38a, 38b made of Ti, and each of first and second ground side electric field adjusting sub-regions 39a, 39b are made of Si. Then, the electric field intensity is increased at a center of the optical waveguide 12b, and thus the function of the electric field is further enhanced.

It should be noted that according to the invention, the ground side electric field adjusting main- and sub-regions may have various constructions. For instance, these regions may be consisting of more than three different kinds of materials or may be constructed a film having a continuously changing conductivity like as the electric field adjusting region formed between the buffer layer and the hot electrode. Such a region may be formed by an alloy of metals or an alloy of metal and semiconductor.

Figure 22:
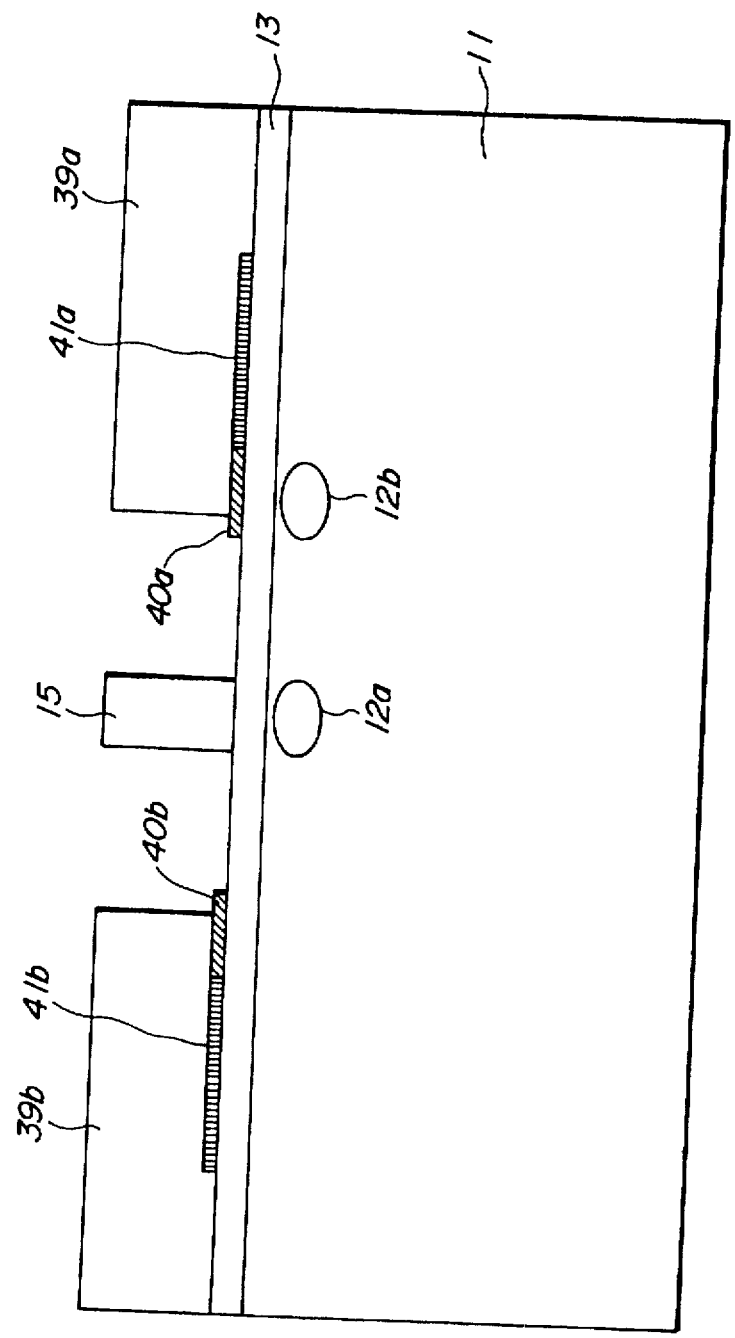
FIG. 22 is a cross sectional view depicting an eleventh embodiment of the optical modulator according to the invention.

FIG. 22 is a cross sectional view illustrating an eleventh embodiment of the optical modulator according to the second aspect of the invention. In the present embodiment, ground side electric field adjusting main- and sub-regions 40a, 41a; 40b, 41b are formed between the buffer layer 13 and a part of ground electrodes 39a, 39b. That is to say, the ground electrodes 39a and 39b are partially brought into direct contact with the buffer layer 13.

Figure 23:
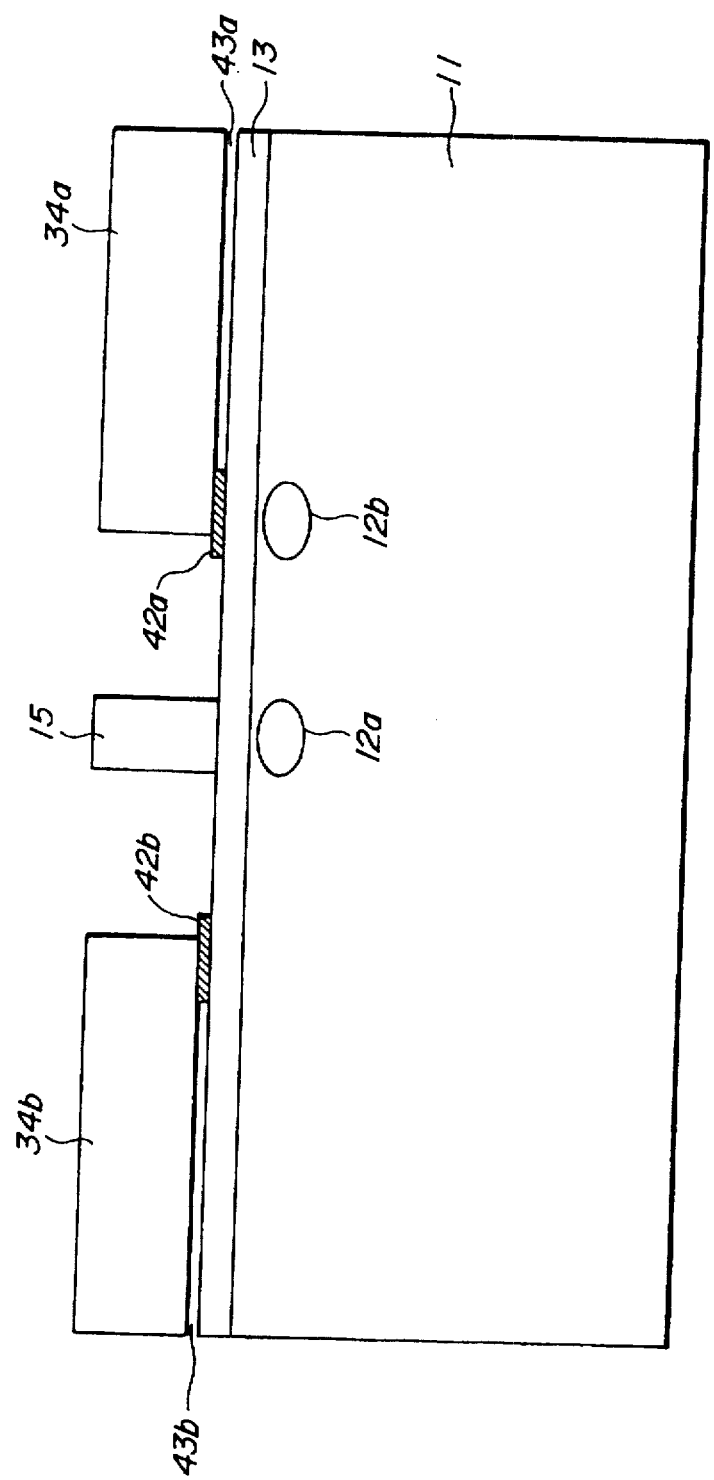
FIG. 23 is a cross sectional view showing a twelfth embodiment of the optical modulator according to the invention.

FIG. 23 is a cross sectional view depicting a twelfth embodiment of the optical modulator according to the second aspect of the invention. In this embodiment, ground side electric field adjusting main-regions 42a and 42b are provided between the buffer layer 13 and the ground electrodes 34a and 34b, respectively. These regions 42a and 42b are formed by a NiCr film having a thickness of 0.1 μm. Ground side electric field adjusting sub-regions 43a and 43b are formed by air gaps having a thickness of 0.1 μm.

Figure 24:
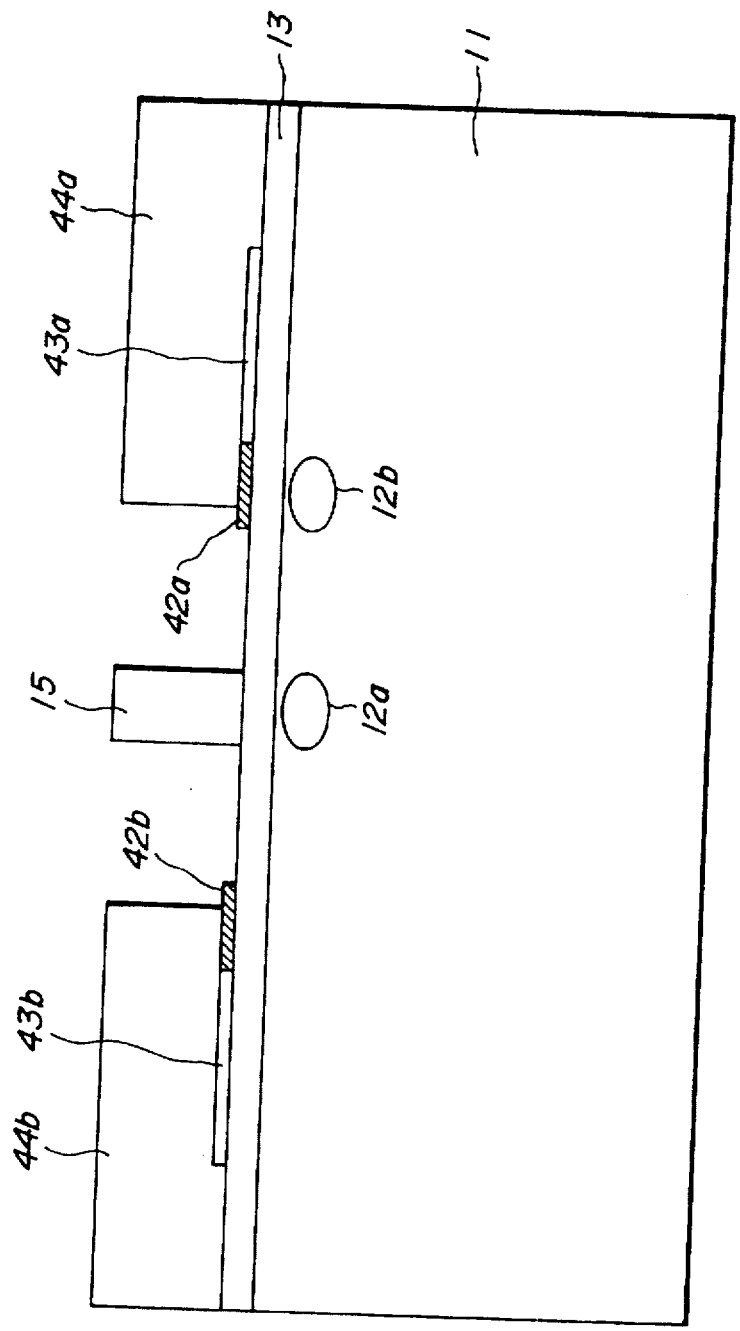
FIG. 24 is a cross sectional view representing a thirteenth embodiment of the optical modulator according to the invention.

FIG. 24 is a cross sectional view showing a thirteenth embodiment of the optical modulator according to the second aspect of the invention. Also in the present embodiment, ground side electric field adjusting sub-regions 43a and 43b are formed by air gaps having a thickness equal of a metal film constituting ground side electric field adjusting main-regions 42a and 42b, but ground electrodes 44a and 44b have projections formed in rear surfaces thereof, said projections having a height equal to a thickness of air gaps. Then, the ground electrodes 44a and 44b are supported on the buffer layer 13 by means of the ground side electric field adjusting main-regions 42a, 42b and the projections.

Figure 25:
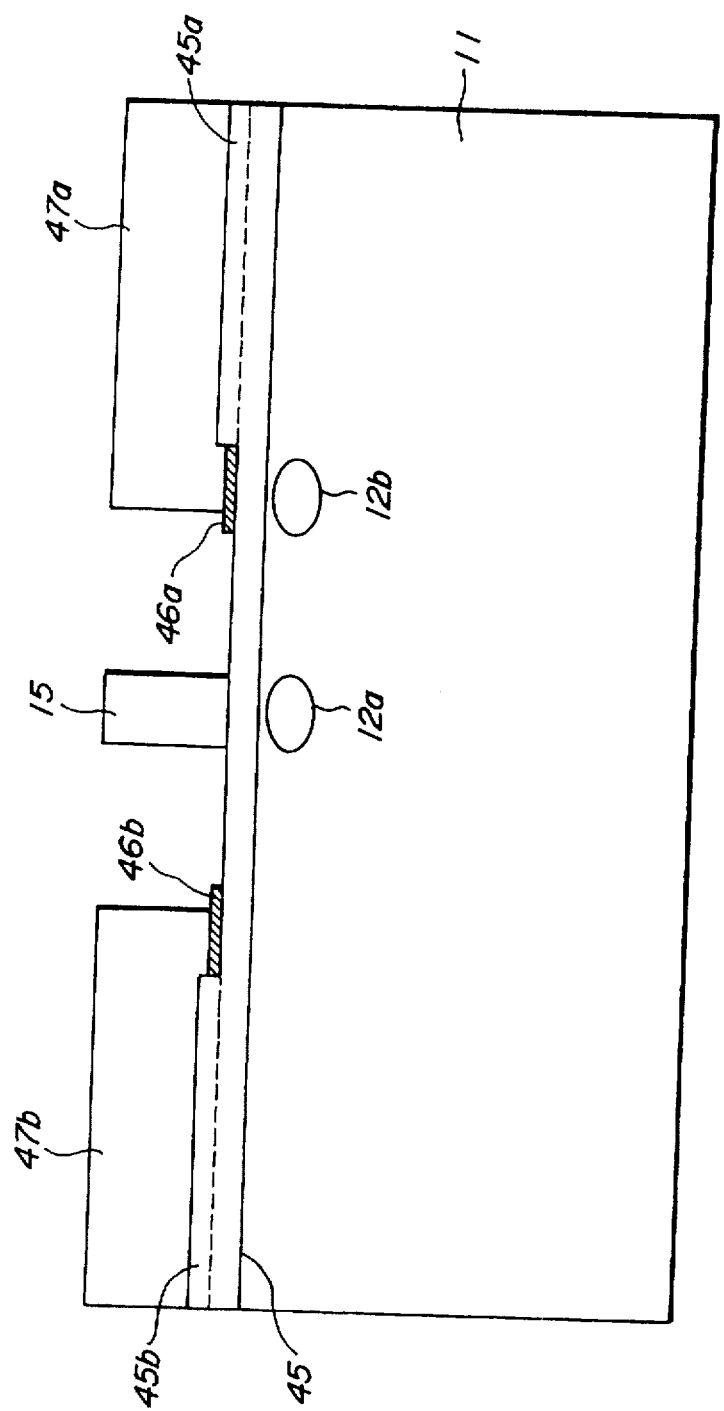
FIG. 25 is a cross sectional view depicting a fourteenth embodiment of the optical modulator according to the invention.

FIG. 25 is a cross sectional view illustrating a fourteenth embodiment of the optical modulator according to the second aspect of the invention. In the present embodiment, in a surface of a buffer layer 45 there are formed projections 45a and 45b which serve as the ground side electric field adjusting sub-region. Ground side electric field adjusting main-regions 46a and 46b are formed by a metal film having a thickness which is smaller than a height of the projections 45a and 45b. Therefore, ground electrodes 47a and 47b have complemental projections formed in lower surfaces thereof corresponding inversely to the projections of the buffer layer 45a and 45b.

Figure 26:
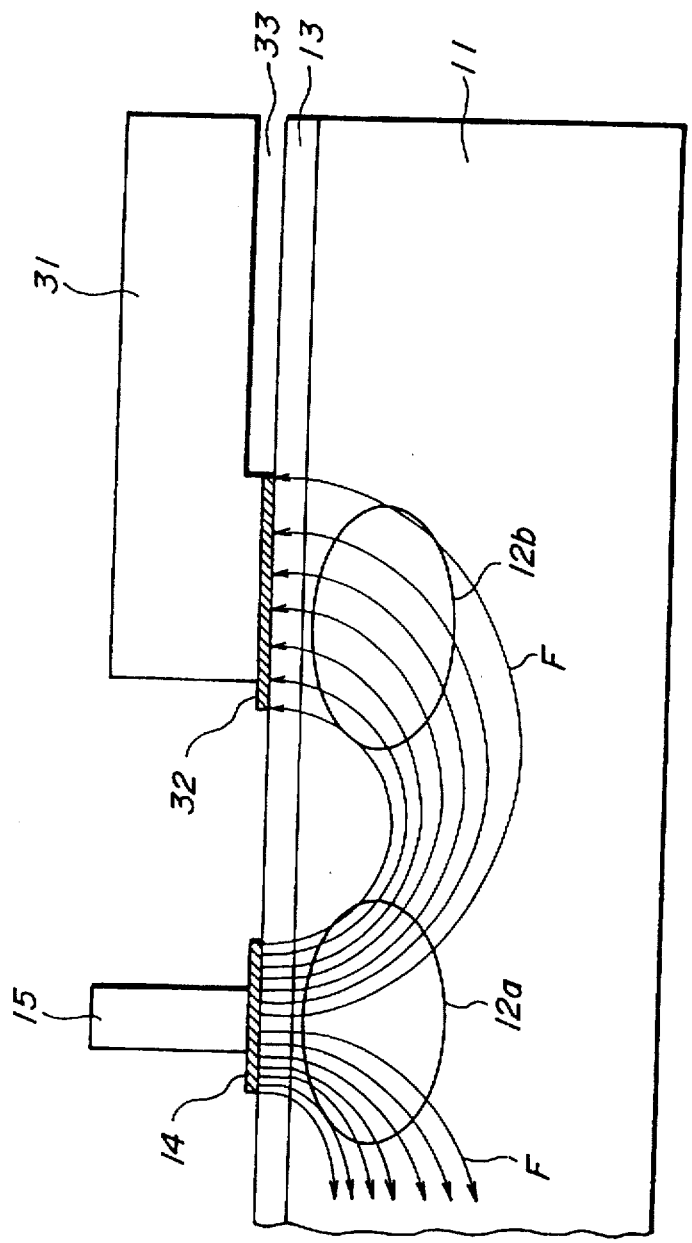
FIG. 26 is a schematic cross sectional view illustrating a fifteenth embodiment of the optical modulator according to the invention.

FIG. 26 is a schematic cross sectional view depicting a fifteenth embodiment of the optical modulator according to a combination of the above mentioned first and second aspects of the invention. In the present embodiment, between the buffer layer 13 and the hot electrode 15 is provided an electric field adjusting region 14 made of Ti like as the first embodiment shown in FIG. 7, and at the same time, between the buffer layer 13 and the ground electrode 31 are provided the ground side electric field adjusting main- and sub-regions 32 and 33. The ground side electric field adjusting main-region 32 is made of NiCr and the sub-region 33 is formed by the air gap just like as the eight embodiment depicted in FIG. 19.

Figure 27:
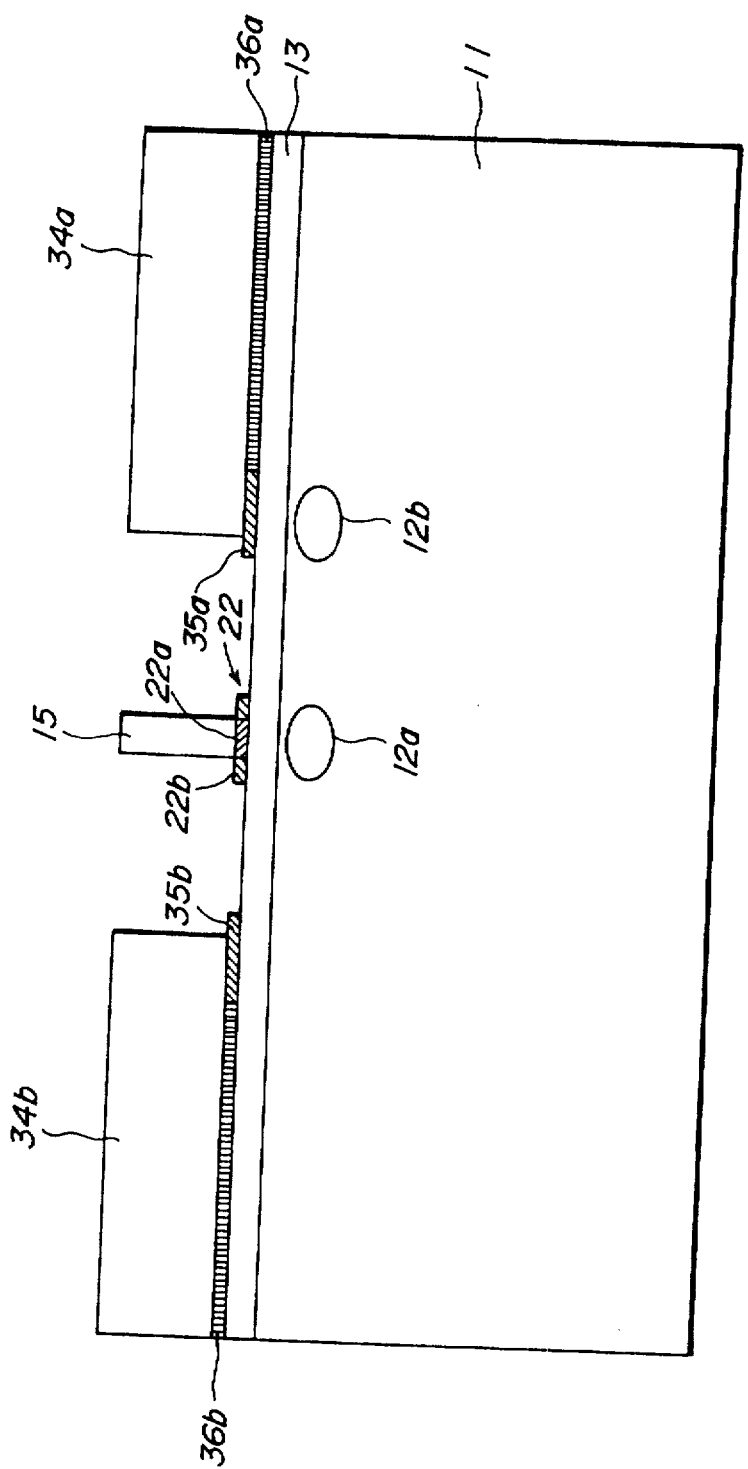
FIG. 27 is a cross sectional view showing a sixteenth embodiment of the optical modulator according to the invention.

FIG. 27 is a cross sectional view showing a sixteenth embodiment of the optical modulator according to a combination of the first and second aspects. In the present embodiment, the electric field adjusting region 22 provided between the buffer layer 13 and the hot electrode 15 is consisting of a central portion 22a made of NiCr and a peripheral portion 22b made of Ti like as the third embodiment shown in FIG. 12. Furthermore, between the ground electrodes 34a, 34b and the buffer layer 13 there are provided ground side electric field adjusting main-regions 35a, 35b made of NiCr and ground side electric field adjusting sub-regions 36a, 36b made of Ti like as the ninth embodiment depicted in FIG. 20.

In the embodiments shown in FIGS. 26 and 27, the electric field is concentrated to the vicinity of both the first and second optical waveguides 12a and 12b, and therefore the interaction between the electric field and the lightwave propagating along these waveguides is enhanced very much and the driving voltage can be decreased very much. Of course, the effective refractive index for the microwave becomes substantially identical with that for the lightwave without affecting the characteristic impedance Z and frequency characteristic of the optical modulator.

In the embodiments as far explained, the optical modulator is constructed as the Mach-Zehnder type having the first and second optical waveguides. In the present invention, it is also possible to construct the optical modulator in any other type than the Mach-Zehnder type.

Figure 28:
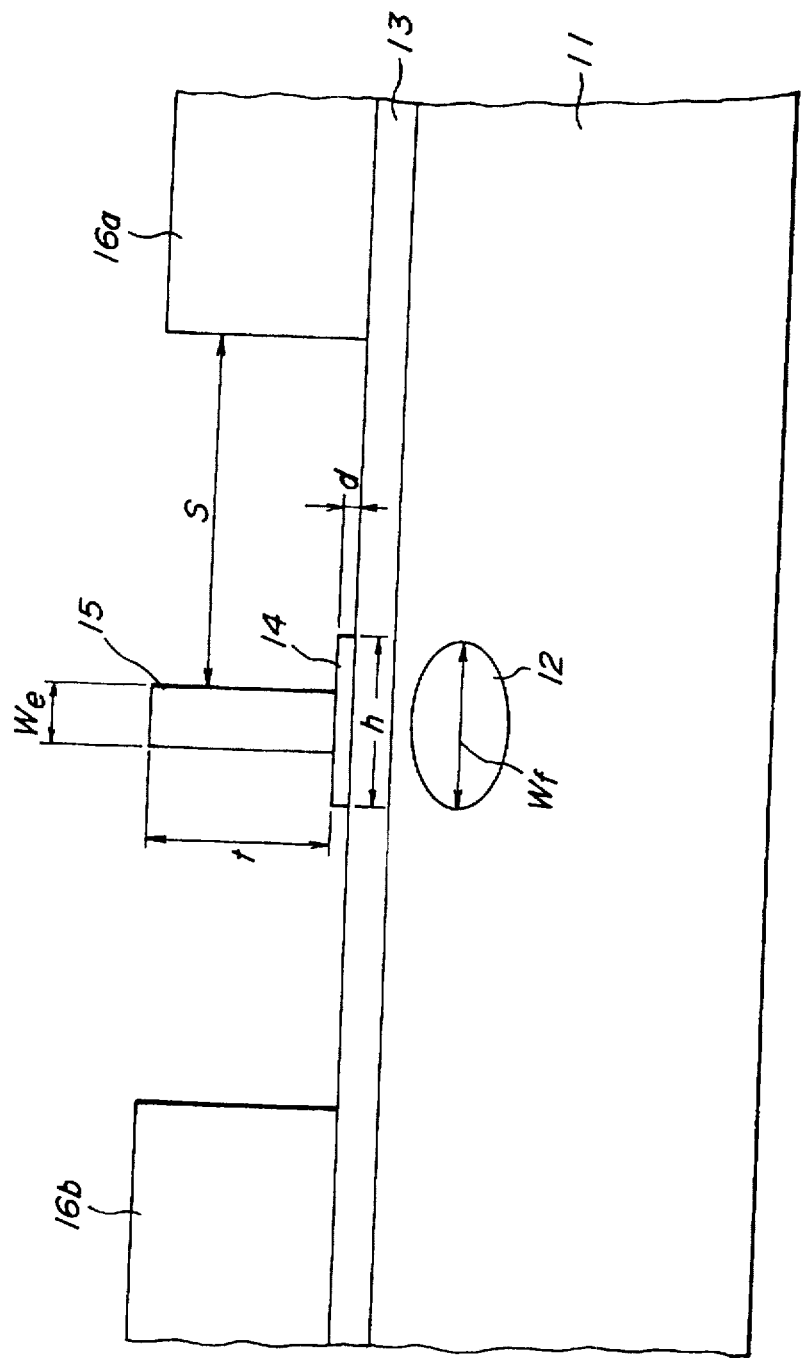
FIG. 28 is a cross sectional view expressing a seventeenth embodiment of the optical modulator according to the invention.

FIG. 28 is cross sectional view showing a seventeenth embodiment of the optical modulator according to the invention. In the present embodiment, in a surface region of a Z-cut LN substrate 11 is formed only a single optical waveguide 12 by effecting a thermal diffusion of Ti. On the surface of the substrate 11, there is formed a buffer layer 13. An electric field adjusting region 14 made of NiCr is deposited on the buffer layer 13 at position immediately above the optical waveguide 12. Further, on the electric field adjusting region 14 is formed a hot electrode 15. As explained above, according to the invention, the electric field adjusting region 14 is formed to have a width h which is substantially equal to a width $W_f$ of the optical waveguide 12 and the hot electrode 15 is formed to have a width $W_e$ which is smaller than the width $W_f$ of the optical waveguide 12. Further, it is no more necessary to make a thickness t of the hot electrode 15 and ground electrodes 16a and 16b larger than an electrode spacing S. Moreover, a thickness d of the electric field adjusting region 14 is set to a value within a range from 150 Å to 1000 Å, which is sufficiently smaller than a thickness t of the hot electrode 15. The optical modulator shown in FIG. 28 may be used as the optical phase modulator or polarization scrambler. Further, in the above embodiments, the substrate is formed by the Z-cut or X-cut LN plate, but according to the invention, it is also possible to use a Y-cut LN plate. Moreover, the substrate may be made of dielectric or semiconductive material having the electrooptical effect other than lithium niobate.

As explained above in detail, according to the invention, it is possible to provide the optical modulator with optical waveguide which can solve the above mentioned problems of the known optical modulators such as the problem of peeling off of the thick hot electrode, the problem of varying the characteristic impedance, frequency characteristic and effective refractive index for the microwave. Further, the optical modulator according to the invention has a wide modulation bandwidth and an excellent impedance matching.

Moreover, in the optical modulator according to the invention, the electric field generated by applied microwave can be concentrated to the vicinity of the optical waveguide and, thus the interaction between the electric field and the lightwave propagating along the optical waveguide can be enhanced. Therefore, the driving voltage can be decreased.

What is claimed is:

1. A waveguide type optical modulator comprising a substrate made of a material having an electrooptical effect, at least one optical waveguide formed in a surface region of said substrate, lightwave to be modulated being propagated along said optical waveguide, a buffer layer formed on the surface of the substrate, electrodes of traveling-wave type comprising a hot electrode applying a microwave and at least one ground electrode provided on said buffer layer, said hot and ground electrodes being extended in parallel with said optical waveguide, characterized in that said hot electrode has a width $W_e$ smaller than a width $W_f$ of said optical waveguide, and that an electric field adjusting region is provided between the hot electrode and the buffer layer, said electric field adjusting region having a width h not smaller than the width $W_e$ of the hot electrode.

2. An optical modulator according to claim 1, characterized in that said electric field adjusting region is formed to have a thickness d and a width h such that a characteristic impedance Z of said electrodes of traveling-wave type and an effective refractive index for the microwave traveling across the said electrodes are not substantially affected by the electric field adjusting region, and an interaction between the distribution of the electric field generated by the microwave applied to the hot electrode and the distribution of the intensity of the lightwave propagating along the optical waveguide is enhanced.

3. An optical modulator according to claim 2, characterized in that said electric field adjusting region has the thickness d from 150 Å to 1 μm and the width h from 2 μm to a smaller value than a sum of the width $W_e$ of the hot electrode and twice of a spacing S between the hot electrode and the ground electrode ($W_e+2S$).

4. An optical modulator according to claim 1, characterized in that said electric field adjusting region is formed above said optical waveguide and has the width h substantially equal to the width $W_f$ of the optical waveguide.

5. An optical modulator according to claim 1, characterized in that said optical waveguide is formed at a position situating between said hot electrode and the ground electrode and said electric field adjusting region has the width h larger than the width $W_f$ of the optical waveguide.

6. An optical modulator according to claim 1, characterized in that said electric field adjusting region is formed to have a non-uniform distribution in conductivity viewed in a direction of the width thereof.

7. An optical modulator according to claim 6, characterized in that said electric field adjusting region is formed by a plurality of materials having different conductivities.

8. An optical modulator according to claim 7, characterized in that the optical waveguide is formed below the hot electrode, and said electric field adjusting region includes a central portion and a peripheral portion having a conductivity lower than that of the central portion.

9. An optical modulator according to claim 7, characterized in that the optical waveguide is formed at a position situating between the hot electrode and the ground electrode, and said electric field adjusting region includes a central portion and a peripheral portion having a conductivity higher than that of the central portion.

10. An optical modulator according to claim 6, characterized in that said electric field adjusting region is formed to have a continuously changing conductivity viewed in the direction of the width thereof.

11. An optical modulator according to claim 10, characterized in that said electric field adjusting region is formed by an alloy obtained by a thermal diffusion.

12. An optical modulator according to any one of claims 1–11, characterized in that said substrate is formed by a lithium niobate $LiNbO_3$ and said optical waveguide is formed by effecting a thermal diffusion of titanium.

13. An optical modulator according to any one of claims 1–11, characterized in that said electric field adjusting region is made of a metal selected from the group consisting of Ti, Cr, Ni, Cu, Au and alloys thereof.

14. An optical modulator according to any one of claims 1–11, characterized in that said electric field adjusting region is made of a semiconductive material selected from the group consisting of Ga, In, As, Al, B, Ge, Si, Sn, Sb and compounds thereof.

15. An optical modulator according to claim 1, characterized in that said optical modulator is constructed as a Mach-Zehnder type optical intensity modulator, first and second optical waveguides are formed in said substrate in parallel with each other, and first and second ground electrodes are provided on the buffer layer such that the first and second ground electrodes are symmetrical with respect to said hot electrode.

16. An optical modulator according to claim 1, characterized in that said optical modulator is constructed as an optical phase modulator or polarization scrambler, a single optical waveguide is formed in said substrate, and first and second ground electrodes are provided on the buffer layer such that the first and second ground electrodes are symmetrical with respect to said hot electrode.

17. A waveguide type optical modulator comprising a substrate made of a material having an electrooptical effect, at least one optical waveguide formed in a surface region of said substrate, lightwave to be modulated being propagated along said optical waveguide, a buffer layer formed on the surface of the substrate, electrodes of traveling-wave type comprising a hot electrode applying a microwave and at least one ground electrode provided on said buffer layer, said hot and ground electrodes being extended in parallel with said optical waveguide, characterized in that a ground side electric field adjusting main-region and a ground side electric field adjusting sub-region are provided between said buffer layer and said ground electrode, said ground side electric field adjusting main- and sub-regions being arranged side by side viewed in a direction of a width of the ground electrode.

18. An optical modulator according to claim 17, characterized in that said ground side electric field adjusting main-region is made of a material having a first conductivity and said ground side electric field adjusting sub-region is made of a material having a second conductivity which is lower than said first conductivity.

19. An optical modulator according to claim 18, characterized in that said ground side electric field adjusting main-region is made of metal, semiconductor or a combination thereof, and said ground side electric field adjusting sub-region is made of metal, semiconductor, dielectric material or a combination thereof.

20. An optical modulator according to claim 18, characterized in that said ground side electric field adjusting sub-region is made of a dielectric material having such a dielectric constant that the interaction between the electric field and the lightwave propagating along the optical waveguide is enhanced.

21. An optical modulator according to claim 18, characterized in that said ground side electric field adjusting main-region is formed by an electrically conductive material layer and said ground side electric field adjusting sub-region is formed by an air gap.

22. An optical modulator according to claim 17, characterized in that said ground side electric field adjusting main- and sub-regions have a thickness and a width such that a characteristic impedance Z of said electrodes of traveling-wave type and an effective refractive index $n_m$ for the microwave traveling across the said electrodes are not substantially affected by the ground side electric field adjusting main- and sub-regions and an interaction between the distribution of the electric field generated by the microwave applied to the hot electrode and the distribution of the intensity of the lightwave propagating along the optical waveguide is enhanced.

23. An optical modulator according to any one of claims 17–22, characterized in that said substrate is made of lithium niobate $LiNbO_3$ and said optical waveguide is formed by effecting a thermal diffusion of titanium into the substrate surface.

24. An optical modulator according to any one of claims 17–22, characterized in that said ground side electric field adjusting main- and sub-regions are made of a metal selected from the group consisting of Ti, Cr, Ni, Cu, Au and alloys thereof.

25. An optical modulator according to any one of claims 17–22, characterized in that said ground side electric field adjusting main- and sub-regions are made of a semiconductive material selected from the group consisting of Ga, In, As, Al, B, Ge, Si, Sn, Sb and compounds thereof.

26. An optical modulator according to claim 17, characterized in that said ground side electric field adjusting main- and sub-regions are made of metal, semiconductor or a combination thereof such that a distribution in conductivity is changed viewed in the direction of a width of the ground electrode.

27. A waveguide type optical modulator comprising a substrate made of a material having an electrooptical effect, at least one optical waveguide formed in a surface region of said substrate, lightwave to be modulated being propagated along said optical waveguide, a buffer layer formed on the surface of the substrate, electrodes of traveling-wave type comprising a hot electrode applying a microwave and at least one ground electrode provided on said buffer layer, said hot and ground electrodes being extended in parallel with said optical waveguide, characterized in that said hot electrode has a width $W_e$ smaller than a width $W_f$ of said optical waveguide, that an electric field adjusting region is provided between the hot electrode and the buffer layer, said electric field adjusting region having a width h not smaller than the width $W_e$ of the hot electrode, and that a ground side electric field adjusting main-region and a ground side electric field adjusting sub-region are provided between said buffer layer and said ground electrode, said ground side electric field adjusting main- and sub-regions being arranged side by side viewed in a direction of a width of the ground electrode.

28. An optical modulator according to claim 27, characterized in that said electric field adjusting region and said ground side electric field adjusting main- and sub-regions are formed to have given thickness and given width such that a characteristic impedance Z of said electrodes of traveling-wave type and an effective refractive index for the microwave traveling across the said electrodes are not substantially affected by the electric field adjusting region and ground side electric field adjusting main- and sub-regions, and an interaction between the distribution of the electric field generated by the microwave applied to the hot electrode and the distribution of the intensity of the lightwave propagating along the optical waveguide is enhanced.

29. An optical modulator according to claim 28, characterized in that said electric field adjusting region is formed to have a non-uniform distribution in conductivity viewed in a direction of the width thereof.

30. An optical modulator according to claim 29, wherein said electric field adjusting region is formed by a plurality of materials having different conductivities.

31. An optical modulator according to claim 29, characterized in that said electric field adjusting region is formed to have a continuously changing conductivity viewed in the direction of the width thereof.

32. An optical modulator according to claim 27, characterized in that said optical modulator is constructed as a Mach-Zehnder type optical intensity modulator, first and second optical waveguides are formed in said substrate in parallel with each other, first and second ground electrodes are provided on the buffer layer such that the first and second ground electrodes are symmetrical with respect to said hot electrode, first ground side electric field adjusting main- and sub-regions are provided between the buffer layer and the first ground electrode, and second ground side electric field adjusting main- and sub-regions are provided between the buffer layer and the second ground electrode.

33. An optical modulator according to claim 27, characterized in that said optical modulator is constructed as an optical phase modulator or polarization scrambler, a single optical waveguide is formed in said substrate, first and second ground electrodes are provided on the buffer layer such that the first and second ground electrodes are symmetrical with respect to said hot electrode, first ground side electric field adjusting main- and sub-regions are provided between the buffer layer and the first ground electrode, and second ground side electric field adjusting main- and sub-regions are provided between the buffer layer and the second ground electrode.

34. An optical modulator according to claim 27, characterized in that said ground side electric field adjusting main-region is made of a material having a first conductivity and said ground side electric field adjusting sub-region is made of a material having a second conductivity which is lower than said first conductivity.

35. An optical modulator according to claim 34, characterized in that said ground side electric field adjusting main-region is made of metal, semiconductor or a combination thereof, and said ground side electric field adjusting sub-region is made of metal, semiconductor, dielectric material or a combination thereof.

36. An optical modulator according to claim 34, characterized in that said ground side electric field adjusting sub-region is made of a dielectric material having such a dielectric constant that the interaction between the electric field generated by applied microwave and the lightwave propagating along the optical waveguide is enhanced.

37. An optical modulator according to claim 34, characterized in that said ground side electric field adjusting main-region is formed by an electrically conductive material layer and said ground side electric field adjusting sub-region is formed by an air gap.

38. An optical modulator according to any one of claims 27-37, characterized in that said substrate is formed by a lithium niobate $LiNbO_3$ and said optical waveguide is formed by effecting a thermal diffusion of titanium.

39. An optical modulator according to any one of claims 27-37, characterized in that said electric field adjusting region is made of a metal selected from the group consisting of Ti, Cr, Ni, Cu, Au and alloys thereof.

40. An optical modulator according to any one of claims 27-37, characterized in that said electric field adjusting region is made of a semiconductive material selected from the group consisting of Ga, In, As, Al, B, Ge, Si, Sn, Sb and compounds thereof.

41. An optical modulator according to any one of claims 27-37, characterized in that said ground side electric field adjusting main- and sub-regions are made of a metal selected from the group consisting of Ti, Cr, Ni, Cu, Au and alloys thereof.

42. An optical modulator according to any one of claims 27-37, characterized in that said ground side electric field adjusting main- and sub-regions are made of a semiconductive material selected from the group consisting of Ga, In, As, Al, B, Ge, Si, Sn, Sb and compounds thereof.

* * * * *

UNITED STATES PATENT AND TRADEMARK OFFICE
CERTIFICATE OF CORRECTION

PATENT NO. : 5,748,358

DATED: : May 5, 1998

INVENTOR(S) : Tohru SUGAMATA et al

It is certified that error appears in the above-identified patent and that said Letters Patent is hereby corrected as shown below:

Please amend the second priority application in Section [30] "Foreign Application Priority Data" to read as follows:

August 7, 1996    Japan    8-208130

Signed and Sealed this

Twentieth Day of April, 1999

Attest:

Q. TODD DICKINSON

*Attesting Officer*    *Acting Commissioner of Patents and Trademarks*